United States Patent
Kaiser et al.

(10) Patent No.: US 11,793,105 B2
(45) Date of Patent: Oct. 24, 2023

(54) CROP INPUT APPLICATOR SYSTEMS, METHODS, AND APPARATUSES

(71) Applicant: 360 Yield Center, LLC, Morton, IL (US)

(72) Inventors: Jesse D. Kaiser, Tremont, IL (US); Lucas J. Helton, Strasburg, IL (US); Gregg A. Sauder, Tremont, IL (US); Justin L. Koch, Morton, IL (US)

(73) Assignee: 360 YIELD CENTER, LLC, Morton, IL (US)

( * ) Notice: Subject to any disclaimer, the term of this patent is extended or adjusted under 35 U.S.C. 154(b) by 500 days.

(21) Appl. No.: 16/640,398

(22) PCT Filed: Aug. 21, 2018

(86) PCT No.: PCT/US2018/047197
§ 371 (c)(1),
(2) Date: Feb. 20, 2020

(87) PCT Pub. No.: WO2019/040414
PCT Pub. Date: Feb. 28, 2019

(65) Prior Publication Data
US 2020/0352089 A1 Nov. 12, 2020

Related U.S. Application Data

(60) Provisional application No. 62/702,299, filed on Jul. 23, 2018, provisional application No. 62/617,485, filed on Jan. 15, 2018, provisional application No. 62/617,050, filed on Jan. 12, 2018, provisional application No. 62/548,002, filed on Aug. 21, 2017.

(51) Int. Cl.
*A01C 7/06* (2006.01)
*A01C 5/06* (2006.01)
(Continued)

(52) U.S. Cl.
CPC ................ *A01C 7/06* (2013.01); *A01C 5/064* (2013.01); *A01C 5/066* (2013.01); *A01C 7/201* (2013.01); *A01C 23/023* (2013.01)

(58) Field of Classification Search
CPC ........... A01C 5/064; A01C 7/06; A01C 23/02; A01C 23/023; A01C 23/025;
(Continued)

(56) References Cited

U.S. PATENT DOCUMENTS

| 4,648,334 A | 3/1987 | Kinzenbaw |
| 6,347,594 B1 * | 2/2002 | Wendling ............... A01C 5/068 |
| | | 111/167 |

(Continued)

FOREIGN PATENT DOCUMENTS

WO    WO-2017087284 A1 *  5/2017  ............. A01B 49/06

OTHER PUBLICATIONS

Office Action issued in Canadian Application No. 3,073,308, dated Mar. 16, 2021, 3 pages.
(Continued)

*Primary Examiner* — Christopher J. Novosad
(74) *Attorney, Agent, or Firm* — Klintworth & Rozenblat IP LLP

(57) ABSTRACT

In one aspect, a planter row unit is provided an includes a frame, a first opener disc configured to open a seed trench, and a second opener disc configured to open a second trench different than the seed trench. The second opener disc is rotatable relative to the frame and is vertically moveable relative to the frame. In one aspect, an opener assembly is provided and includes a bracket, an opener disc coupled to the bracket and rotatable relative to the bracket and vertically moveable relative to the bracket, and a biasing member coupled to and between the bracket and the opener disc. The biasing member biases the opener disc vertically downward.

(Continued)

In one aspect, a planter row unit is provided and includes an applicator support member made of a resilient material to allow movement of the applicator support member and inhibit deformation of the applicator support member.

17 Claims, 31 Drawing Sheets

(51) Int. Cl.
*A01C 23/02* (2006.01)
*A01C 7/20* (2006.01)

(58) Field of Classification Search
CPC ..... A01C 23/027; A01C 23/028; A01C 5/066; A01C 7/201; A01C 7/00; A01C 5/062; A01C 5/06; A01C 5/00; A01C 7/20; A01C 23/00
See application file for complete search history.

(56) References Cited

U.S. PATENT DOCUMENTS

| | | | | |
|---|---|---|---|---|
| 2007/0044694 | A1* | 3/2007 | Martin | A01C 5/064 |
| | | | | 111/121 |
| 2008/0282950 | A1* | 11/2008 | Medernach | A01C 5/064 |
| | | | | 29/891 |
| 2011/0000408 | A1* | 1/2011 | Martin | A01C 5/064 |
| | | | | 111/121 |
| 2015/0144039 | A1* | 5/2015 | Benko | A01C 5/064 |
| | | | | 111/119 |
| 2015/0250094 | A1* | 9/2015 | Hodel | A01C 7/20 |
| | | | | 111/189 |
| 2015/0271986 | A1* | 10/2015 | Sauder | A01B 63/32 |
| | | | | 172/180 |
| 2016/0084298 | A1 | 3/2016 | Schaffert et al. | |
| 2017/0215334 | A1* | 8/2017 | Dienst | A01C 7/205 |
| 2017/0318736 | A1* | 11/2017 | Roberge | A01C 7/206 |
| 2017/0367250 | A1* | 12/2017 | Hagny | A01B 15/16 |
| 2020/0053953 | A1* | 2/2020 | Andres | A01C 7/205 |

OTHER PUBLICATIONS

Yetter Farm Equipment, "Hd Twisted Link Drag Chain Kit" [online] (retrieved from the internet on Oct. 10, 2018) <URL http://www.sloanex.com/productpdfs/6200-108.pdf>. Dec. 13, 2012 (Dec. 13, 2012); entire document, especially p. 1-2.

International Search Report and Written Opinion for PCT Application No. PCT/US18/47197 dated Jan. 17, 2019, 10 pages.

* cited by examiner

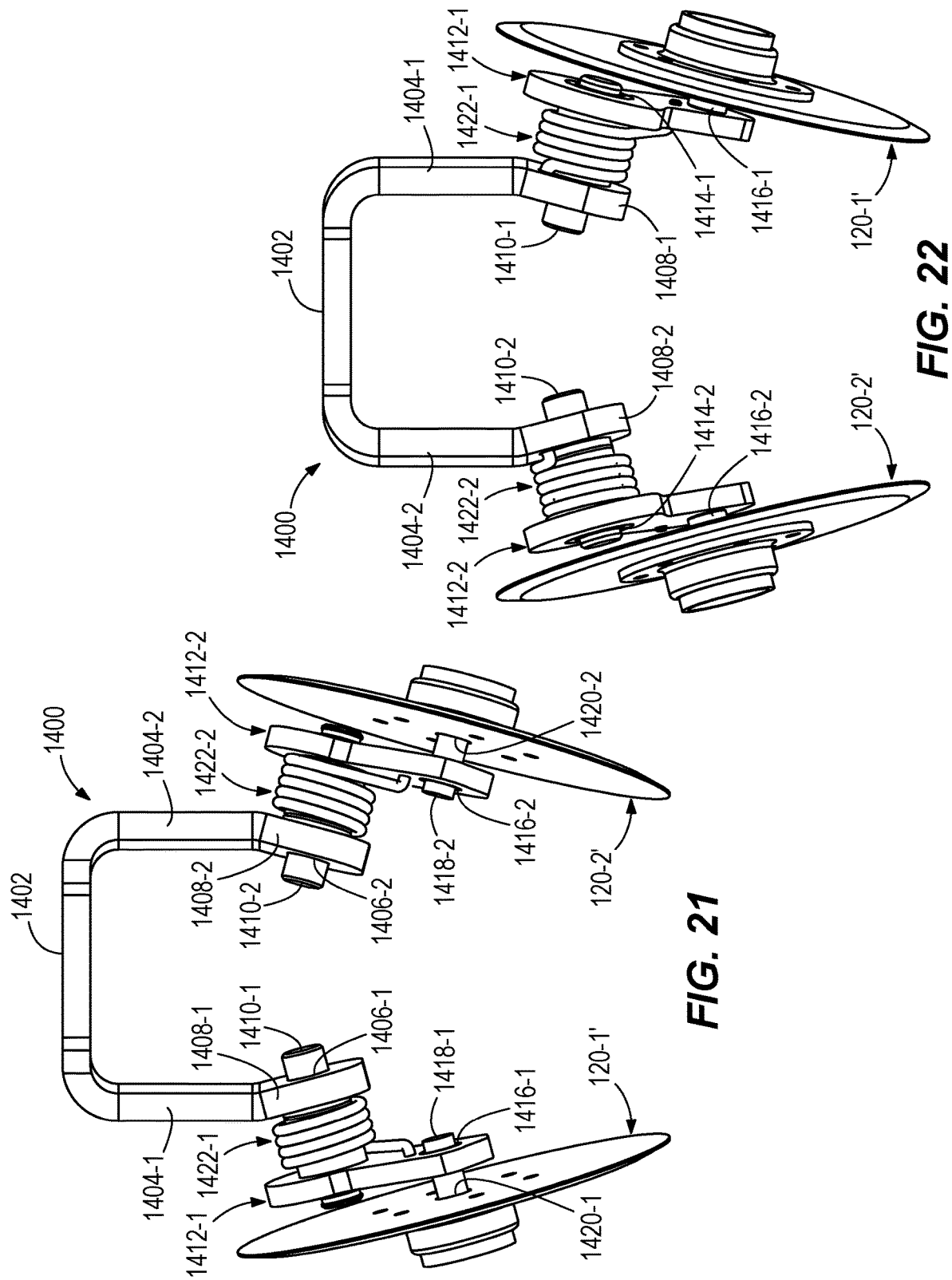

CROP INPUT APPLICATOR SYSTEMS, METHODS, AND APPARATUSES

RELATED APPLICATIONS

The present application claims the priority benefit of U.S. Provisional Patent Application Nos. 62/548,002, filed Aug. 21, 2017, 62/617,050, filed Jan. 12, 2018, 62/617,485, filed Jan. 15, 2018, and 62/702,299, filed Jul. 23, 2018 and International Patent Application No. PCT/US18/47197 filed Aug. 21, 2018, all of which are incorporated by reference herein.

FIELD OF THE DISCLOSURE

The present application generally relates to agricultural equipment and, more particularly, to agricultural applicators for crop inputs.

BACKGROUND

Crop input applicators are used to apply crop inputs (e.g., liquid, fertilizer, nitrogen, etc.) into soil. Some such applicators are incorporated on a planter row unit, such as on a closing wheel assembly of the planter row unit.

SUMMARY

In one aspect, a planter row unit is provided and includes a frame, a first opener disc rotatably coupled to the frame and configured to open a seed trench, a closing wheel rotatably coupled to the frame and configured to close the seed trench, and a second opener disc coupled to the frame and configured to open a second trench different than the seed trench. The second opener disc is rotatable relative to the frame and is vertically moveable relative to the frame.

In one aspect, the planter row unit may further include a biasing member configured to bias the second opener disc downward.

In one aspect, the planter row unit may further include a coupling member coupled to and between the second opener disc and the frame. The coupling member and the second opener disc may be rotatable relative to the frame.

In one aspect, the planter row unit may further include a first shaft coupled to the coupling member and the frame and a second shaft coupled to the second opener disc and the coupling member. The second opener disc may rotate about the second shaft relative to the coupling member and the frame. The second opener disc and the coupling member may rotate relative to the frame via the first shaft.

In one aspect, the planter row unit may further include a biasing member configured to bias the second opener disc downward.

In one aspect, the biasing member may be at least partially wrapped around the first shaft.

In one aspect, an opener assembly for a planter row unit is provided and includes a bracket configured to couple to the planter row unit and an opener disc coupled to the bracket. The opener disc is rotatable relative to the bracket and is vertically moveable relative to the bracket. The opener assembly also includes a biasing member coupled to and between the bracket and the opener disc. The biasing member biases the opener disc vertically downward.

In one aspect, the opener assembly may further include a coupling member coupled to and between the opener disc and the bracket. The coupling member and the opener disc may be rotatable relative to the bracket.

In one aspect, the opener assembly may further include a first shaft coupled to the coupling member and the bracket and a second shaft coupled to the opener disc and the coupling member. The opener disc may rotate about the second shaft relative to the coupling member and the bracket. The opener disc and the coupling member may rotate relative to the bracket via the first shaft.

In one aspect, the biasing member may be at least partially wrapped around the first shaft.

In one aspect, the biasing member may have a first stiffness setting and a second stiffness setting to provide different stiffnesses to affect vertical movement of the opener disc.

In one aspect, the opener assembly may further include an adjustment mechanism configured to adjust a stiffness of the biasing member to affect vertical movement of the opener disc.

In one aspect, the bracket may include a first recess and a second recess. The biasing member may be selectively moveable between a first position, in which a portion of the biasing member engages the first recess to provide a first stiffness to the biasing member, and second position, in which the portion of the biasing member engages the second recess to provide a second stiffness to the biasing member different than the first stiffness.

In one aspect, a planter row unit is provided and includes a frame, a first opener disc rotatably coupled to the frame and configured to open a seed trench, a closing wheel rotatably coupled to the frame and configured to close the seed trench, a second opener disc rotatably coupled to the frame and configured to open a second trench different than the seed trench, and an applicator support member coupled to the frame and at least partially alignable with the second trench. The applicator support member is made of a resilient material to allow movement of the applicator support member and inhibit deformation of the applicator support member. The planter row unit also includes an applicator supported by the applicator support member and configured to dispense crop input into the second trench.

In one aspect, the applicator support member may be made of plastic material.

In one aspect, the second opener, the applicator support and the applicator may be vertically moveable relative to the frame.

In one aspect, the second opener, the applicator support and the applicator are rotatable relative to the frame.

In one aspect, the applicator may be a tube.

In one aspect, a planter row unit is provided and includes a frame and an opener disc rotatably coupled to the frame and configured to open a seed trench. The seed trench defines a seed trench plane. The planter row unit also includes a pair of closing wheels rotatably coupled to the frame and configured to close the seed trench and a finishing device coupled to the frame and configured to engage a ground surface. The finishing device is downstream, in a direction of travel of the planter row unit, of the pair of closing wheels. The planter row unit further includes a pair of support arms coupled to and between the finishing device and the frame. The pair of support arms are spaced-apart from each other and each of the support arms includes a first end coupled to the frame and a second end coupled to the finishing device, and a medial portion between the first end and the second end. The medial portion is disposed further away from the seed trench plane than the first end and the second end of the support arm.

In one aspect, the finishing device may be a chain, and the second ends of the pair of support arms may be coupled to respective ends of the chain.

In one aspect, each of the pair of support arms may further include a first arm portion including a first arm first end and a first arm second end. The first arm first end may be coupled to the frame. Each of the pair of support arms may also include a second arm portion including a second arm first end and a second arm second end. The second arm first end may be coupled to the first arm second end and the second arm second end may be coupled to the finishing device. The second arm portion may be rotatable relative to the first arm portion.

In one aspect, the first arm first end may be closer to the seed trench plane than the first arm second end. The second arm first end may be further from the seed trench plane than the second arm second end.

BRIEF DESCRIPTION OF THE DRAWINGS

FIG. 21 is a rear elevation view of a portion of the planter row unit of FIG. 17.

FIG. 22 is a front elevation view of the portion of the planter row unit of FIGS. 17 and 21.

DESCRIPTION

Figure 1:
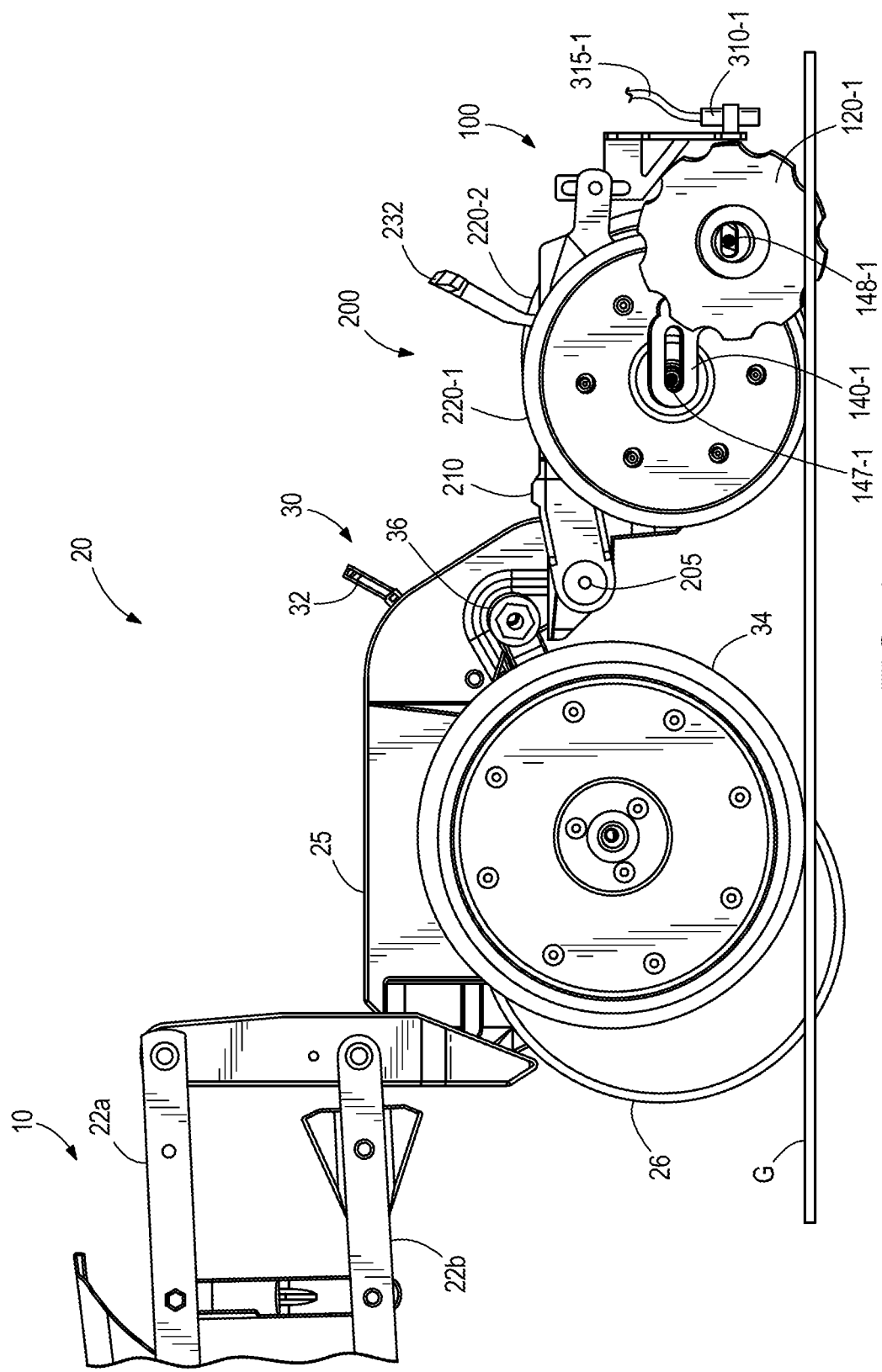
FIG. 1 is a side elevation view of one example of a planter row unit.

Referring to the drawings, wherein like reference numerals designate identical or corresponding parts throughout the several views, FIG. 1 illustrates a planter row unit 10 operably supported on a ground surface G. The row unit 10 is operably coupled to an agricultural machine or device such as, for example, a planter (not shown). The planter row unit 10 may include, e.g., a subframe 25, to couple the planter row unit 10 to a transversely-extending toolbar (not shown) of the planter by a set of parallel arms 22a, 22b.

One or more opener discs 26 are rollingly supported on the planter subframe 25 (e.g., on a downwardly-extending shank thereof) and disposed to open a seed trench (e.g., V-shaped trench) in the ground surface G. A seed meter (not shown) is optionally disposed on the planter (e.g., on the row unit 10) and is optionally in communication with a seed belt or seed conveyor for transferring seeds into the seed trench.

A gauge wheel assembly 30 is optionally configured to set the depth of the seed trench (e.g., the depth to which the opener discs 26 penetrate the ground surface G). The gauge wheel assembly 30 optionally comprises one or more gauge wheels 34 which may be disposed adjacent to the opener discs 26. The gauge wheels 34 are optionally pivotally coupled to the subframe 25, e.g., by one or more gauge wheel arms 36. The upward travel of gauge wheel arms 36 is optionally limited by a stop 32 which is optionally pivotally adjustable (e.g., using an adjustment handle extending from the subframe 25 as illustrated).

In operation, the row unit 10 optionally opens the seed trench in the soil and optionally deposits (e.g., meters) seeds into the seed trench.

A closing wheel assembly 200 is optionally operably coupled to the row unit 10. In some examples, the closing wheel assembly 200 comprises a subframe 210 which is optionally pivotally coupled to the row unit subframe 25

Figure 5:
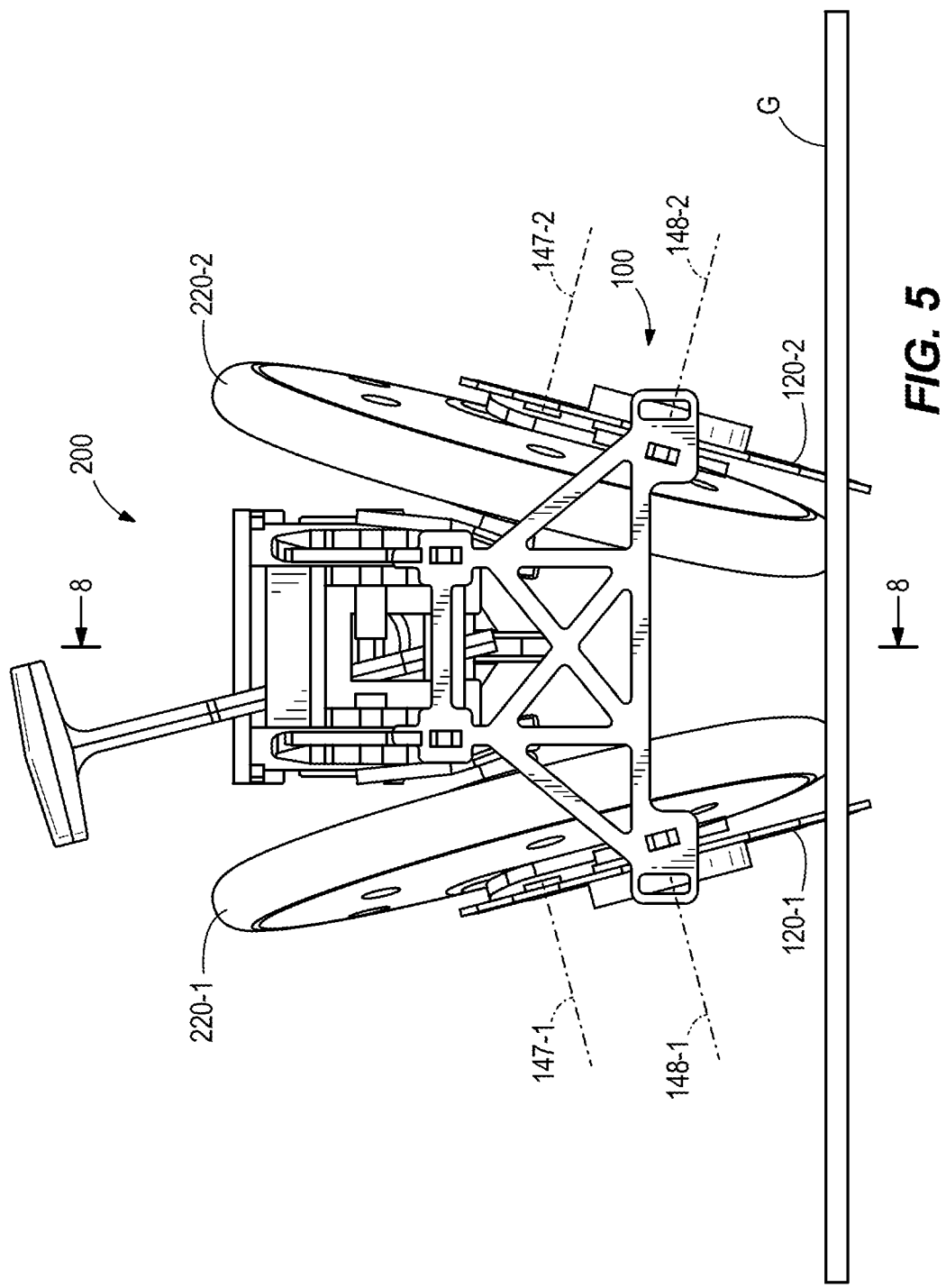
FIG. 5 is a rear elevation view of at least a portion of the closing wheel assembly of FIG. 2.

(e.g., at a pivot connection 205). In the illustrated example, first and second closing wheels 220-1, 220-2 are rollingly supported on the subframe 210. Referring to FIG. 5, the closing wheels 220-1, 220-2 are optionally disposed at an upwardly diverging angle and/or at a forwardly diverging angle. In some examples, each closing wheel 220-1, 220-2 may comprise metal and optionally includes a circumferential rim made of a second material (e.g., rubber, polymer, plastic, etc.) In some examples, each closing wheel may include spikes, scallops, or other features optionally arranged about the circumference thereof.

Figure 8:
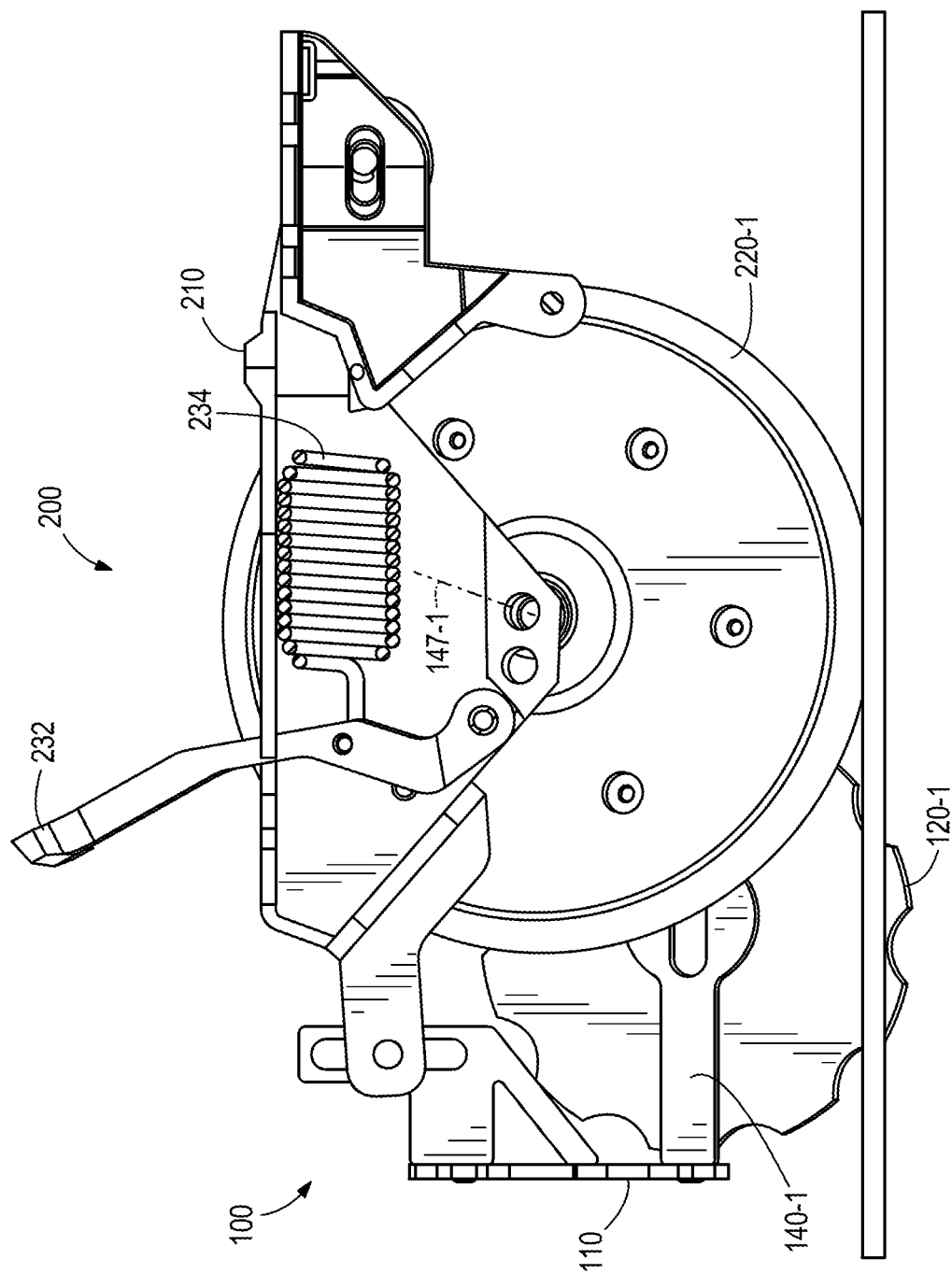
FIG. 8 is a cross-sectional view taken along section line 8-8 of FIG. 5.

Referring to FIG. 8, in some examples the closing wheel assembly 200 is downwardly biased for resilient engagement with the ground surface G. For example, a biasing member or element 234, such as, for example, a spring or actuator, may be used to bias the closing wheel downward. In some examples, a user interface 232 such as an adjustable-position handle may be used to modify the biasing force applied to the closing wheel assembly 200 (e.g., by modifying the extension of a spring).

In operation, the closing wheel assembly 200 at least partially closes the seed trench, e.g., by pinching soil between the closing wheels 220-1, 220-2.

Figure 2:
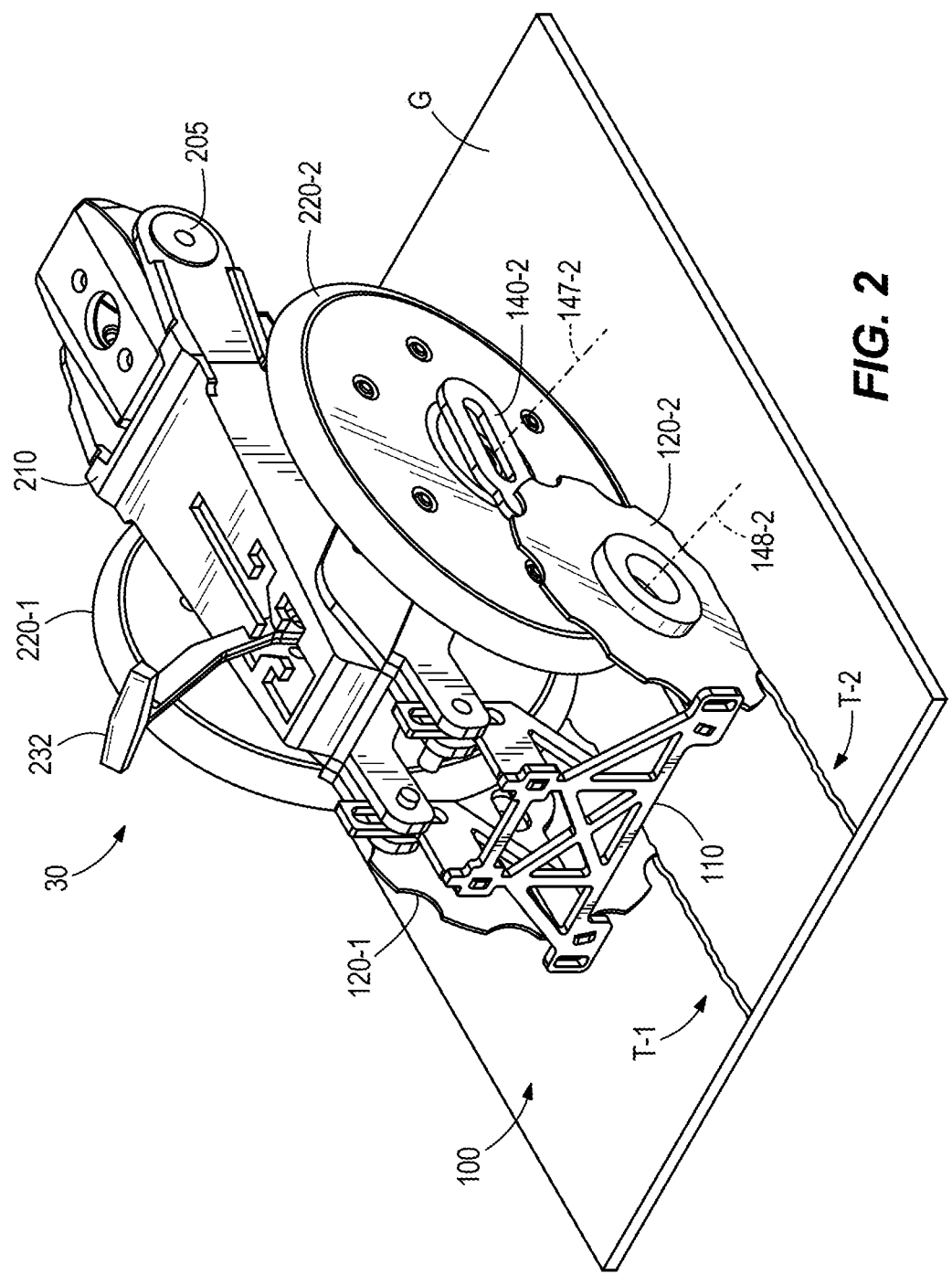
FIG. 2 is a top, rear perspective view of one example of a closing wheel assembly and one example of an applicator assembly included in the planter row unit of FIG. 1.

Referring now to FIG. 2, an applicator assembly 100 is optionally mounted to (and/or operably supported on) the closing wheel assembly 200. With further reference to FIG. 2 and additional reference to FIGS. 3-6, the applicator assembly 100 optionally includes openers 120-1 and 120-2. In various examples, the openers 120-1, 120-2 may comprise discs or coulters which may be rollingly supported on a support arm 140 of the applicator assembly as described further herein. In other examples, the openers 120-1, 120-2 may comprise knives or other structure which may be rigidly mounted to the support arm 140 or other structure on the applicator assembly 100. Referring to FIG. 5, the openers 120-1, 120-2 are optionally disposed at an upwardly diverging angle. In some examples, each opener 120-1, 120-2 includes scallops, divots, spikes, or other features arranged about a circumference thereof. In some examples, only one opener 120 may be included in the applicator assembly 100.

Figure 6:
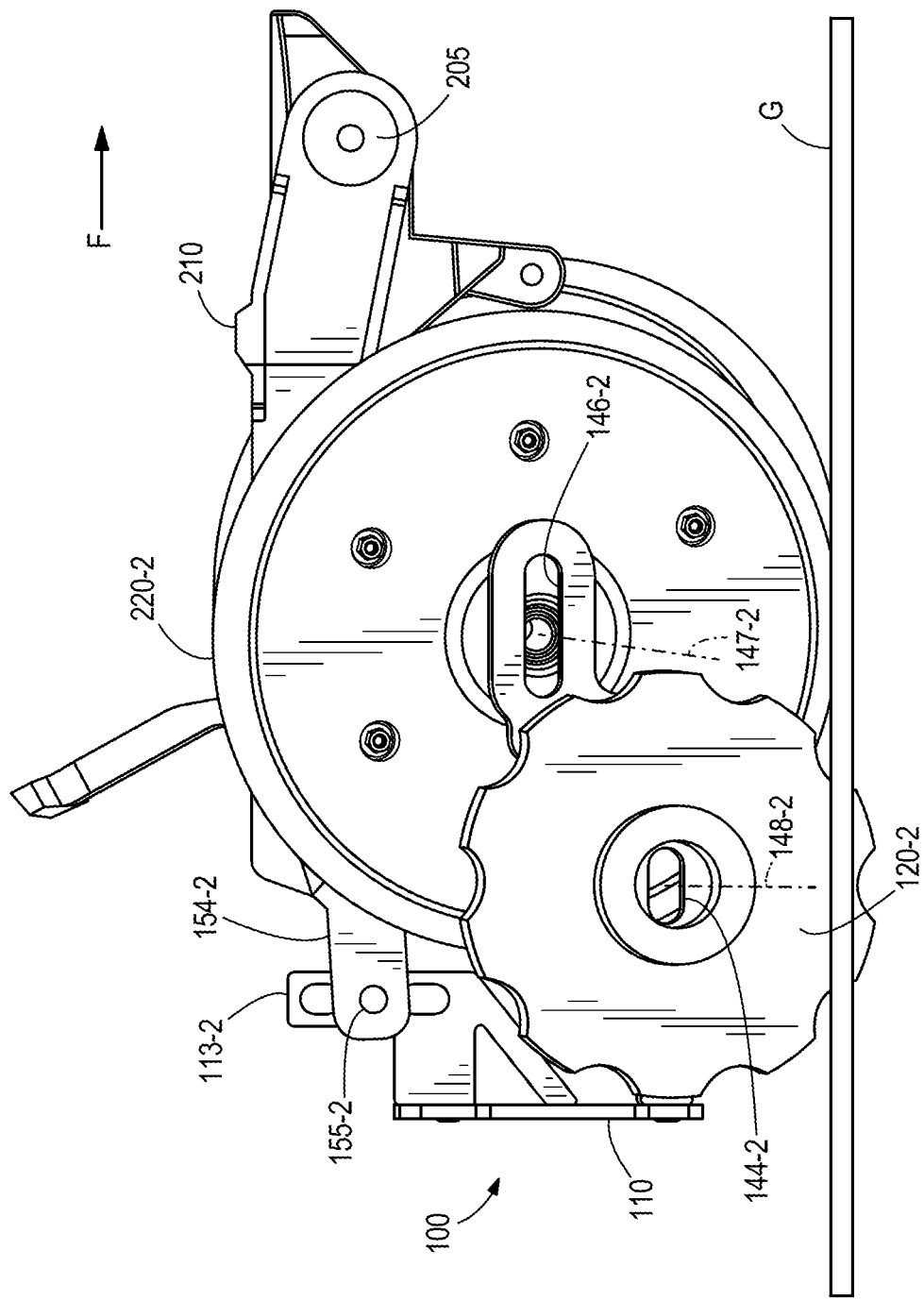
FIG. 6 is a side elevation view of at least a portion of the closing wheel assembly of FIG. 2.
Figure 7:
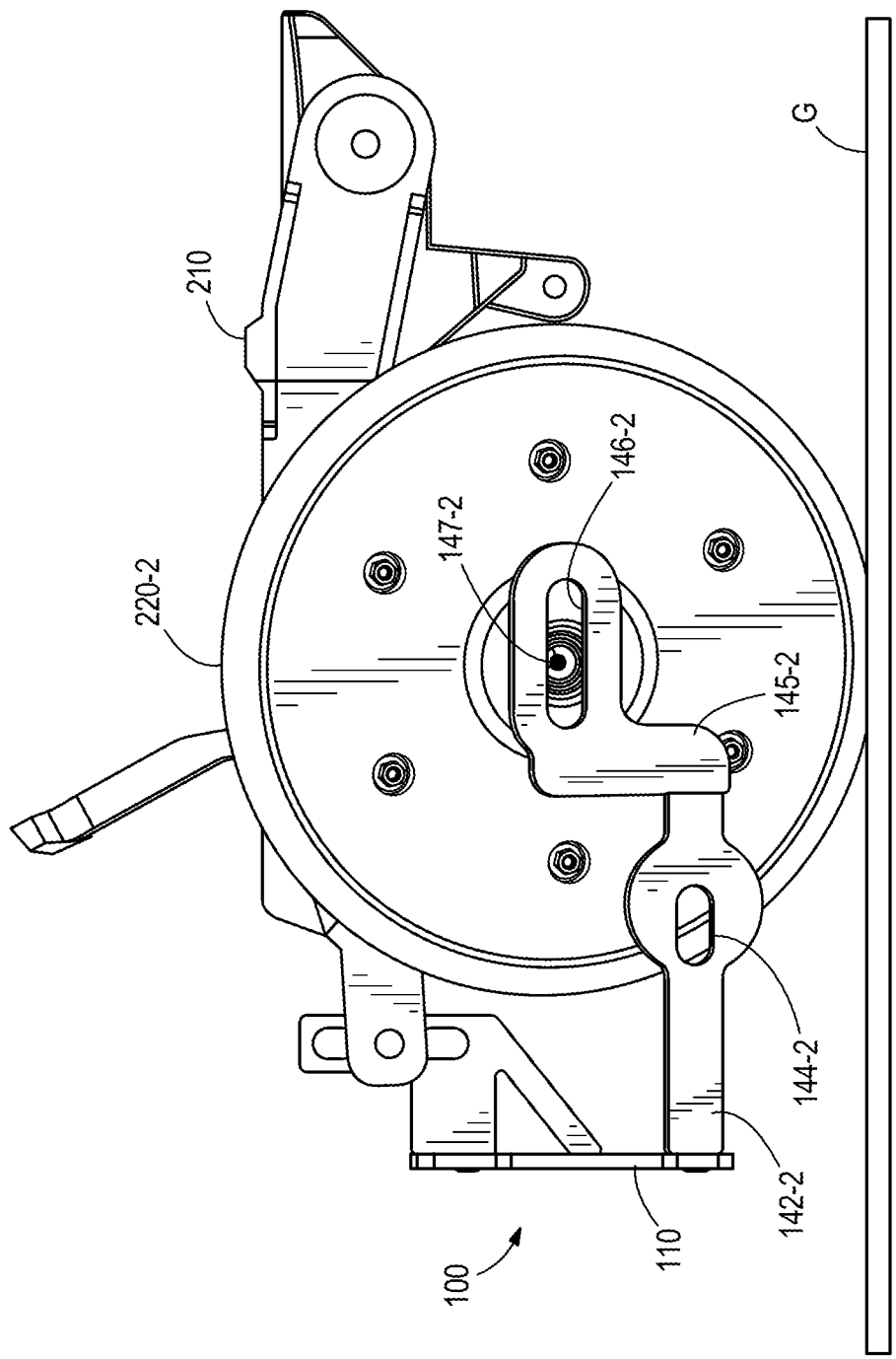
FIG. 7 is a partial side elevation view of at least a portion of the closing wheel assembly of FIG. 2 with a disc thereof not shown for illustrative purposes.

Referring to FIG. 6, in some examples, each opener 120-1, 120-2 is disposed adjacent to one of the closing wheels 220-1, 220-2, respectively. Each opener 120-1, 120-2 is optionally disposed at least partially rearward of the adjacent closing wheel 220-1, 220-2. In some examples, a first vertical axis extending through a rotational axis of the opener 120 is located forward of a rearward end of the adjacent closing wheel. In some examples, the first vertical axis is located rearward of a second vertical axis extending through a rotational axis of the adjacent closing wheel. It should be appreciated that the terms "forward" and "rearward" are used herein with respect to the forward direction of travel of the implement (e.g., forward direction of travel to the right as viewed in FIG. 6 and generally represented by arrow F). In alternative examples, one or more of the openers 120 is optionally disposed at least partially forward of the adjacent closing wheel 220.

In operation, the openers 120-1, 120-2 optionally open trenches T-1, T-2 (see FIG. 2), respectively in the ground surface G. Each of the trenches T-1, T-2 is optionally spaced from a central vertical axis (e.g., a vertical axis intersecting the seed trench) by a horizontal distance (e.g., greater than 0.5 inches, between 0.5 and 3 inches, greater than 1 inch, between 1 and 2 inches, between 1 and 3 inches, approximately 2 inches, between 1.5 and 2.5 inches, etc.). In some examples, in operation at least some accumulated material (e.g., mud, soil, dirt, debris, etc.) on an opener 120 is removed from the opener by contact with the adjacent closing wheel 220. In some examples, in operation a lower forward portion of the opener 120 rotates along a first path (e.g., generally downward and forward) while a lower rearward portion of the adjacent closing wheel 220 rotates along a second path (e.g., generally upward and rearward); the first path is optionally adjacent to the second path.

Figure 9:
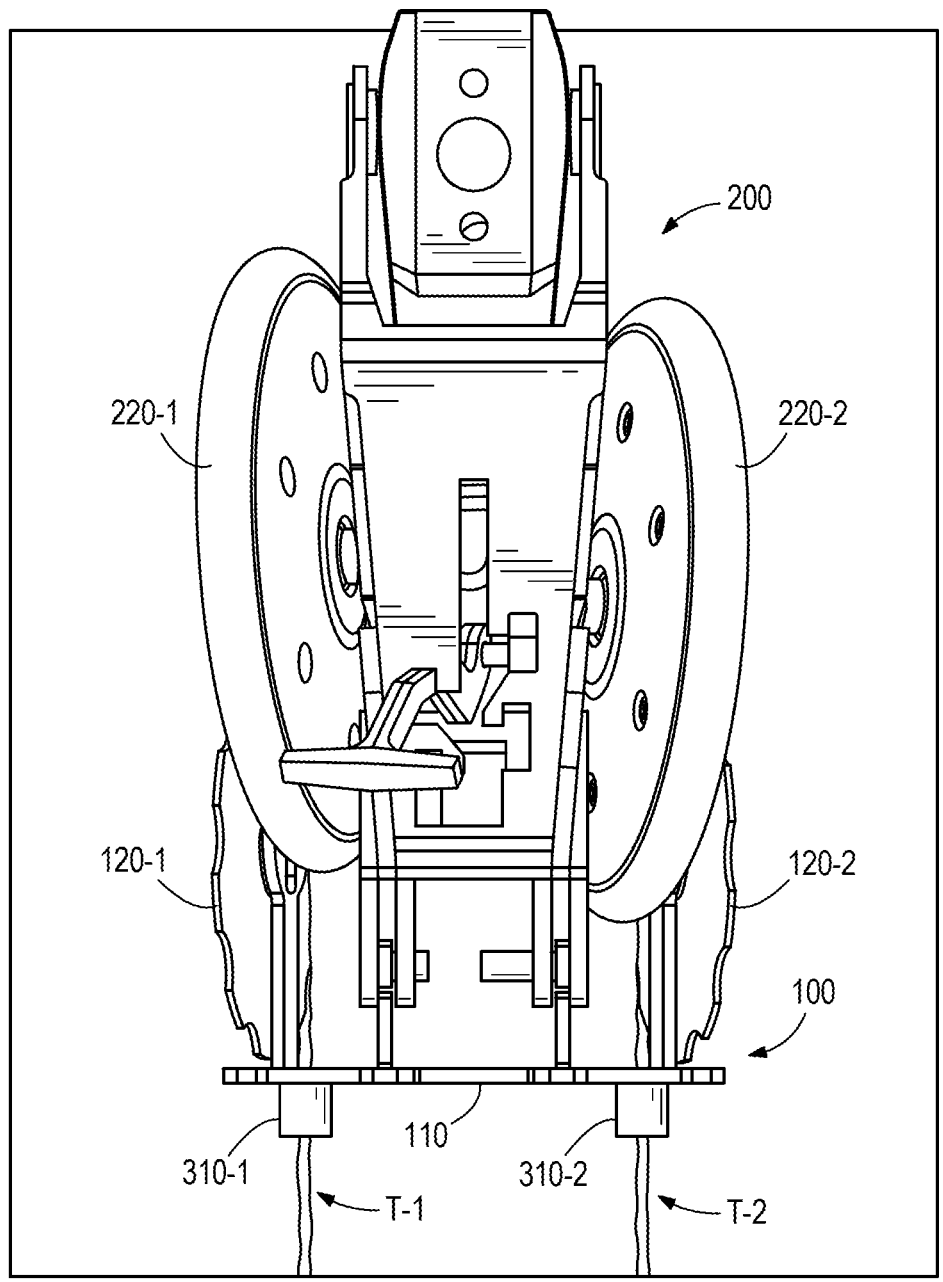
FIG. 9 is a top view of at least a portion of the closing wheel assembly of FIG. 2.
Figure 33:
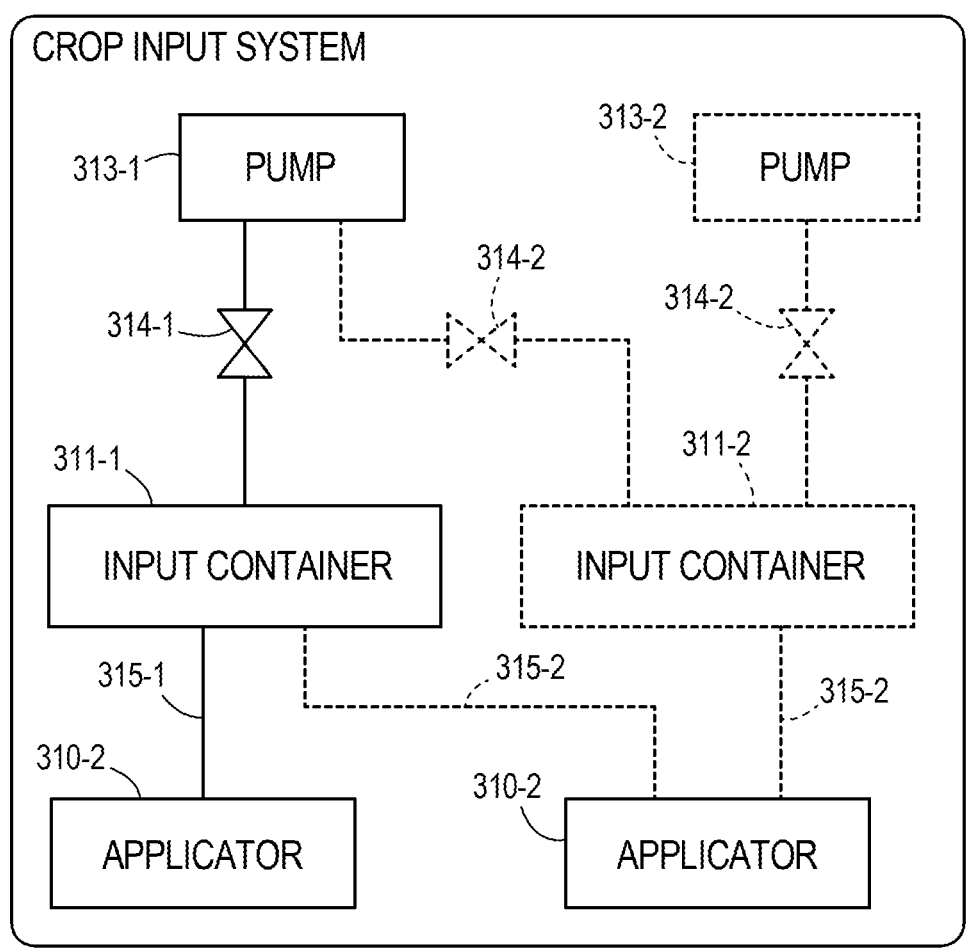
FIG. 33 is a schematic of one example of a crop input system.

Referring to FIGS. 1 and 9, in some examples, the applicator assembly 100 supports one or more applicators 310 (e.g., tubes, valves, nozzles, orifices, etc.). In some examples, the applicator assembly 100 supports first and second applicators 310-1, 310-2. In some examples, the applicators 310-1, 310-2 are disposed above the trenches T-1, T-2 respectively and/or disposed to deposit crop input (e.g., fluid, liquid, fertilizer, nitrogen, starter fertilizer, etc.) into the trenches T-1, T-2, respectively. In some examples, the applicators 310-1, 310-2 are disposed behind the openers 120-1, 120-2, respectively. In some examples, the applicators 310-1, 310-2 are mounted to a frame such as a rear frame 110 described further herein. The applicators 310-1, 310-2 are each optionally in fluid communication (e.g., by conduits 315—see FIG. 1) with one or more crop input sources 311-1, 311-2 (e.g., one or more tanks, containers, etc.); an input system including one or more pumps 313-1, 313-2 and/or valves 314-1, 314-2 optionally supplies crop input to the applicators 310-1, 310-2 in operation. One example of the input system is shown in FIG. 33.

In some examples, some or all components of the rear frame 110 are made of polymer, metal, or other materials and may be either flexible, semi-flexible or rigid.

Figure 3:
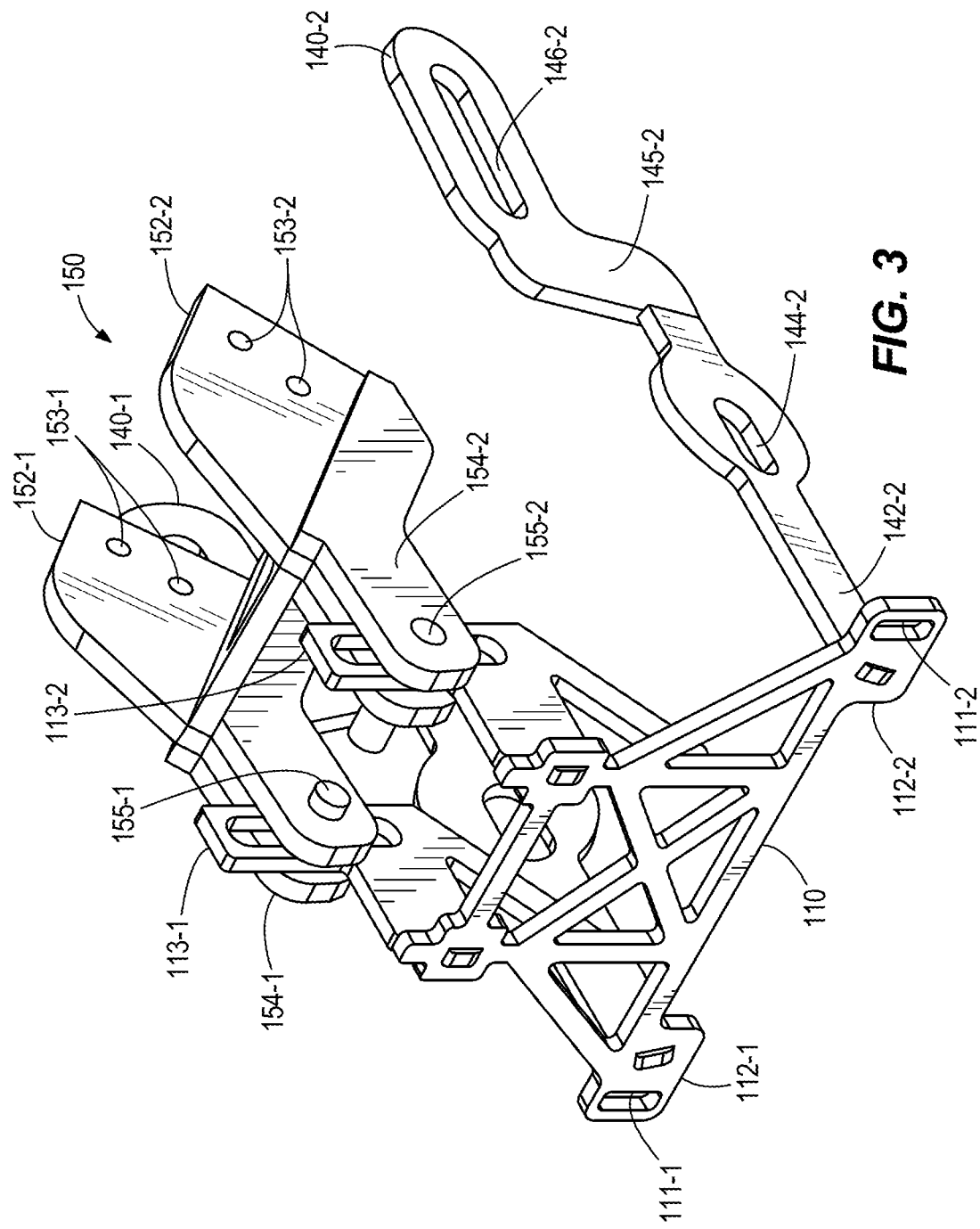
FIG. 3 is a top, rear perspective view of at least a portion of the applicator assembly of FIG. 2.
Figure 4:
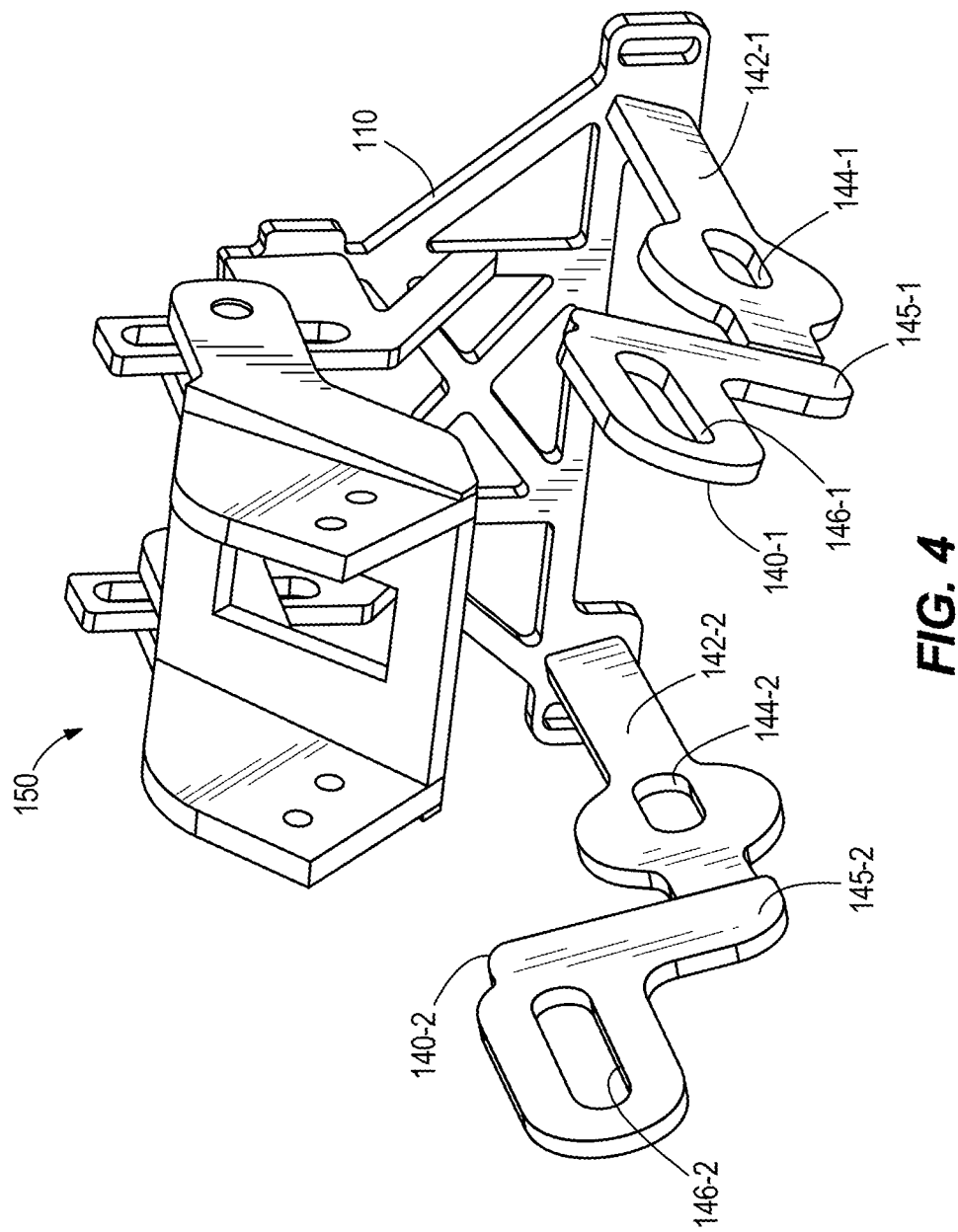
FIG. 4 is another top, rear perspective view of at least a portion of the applicator assembly of FIGS. 2 and 3.

Referring to FIGS. 2 and 3, each support arm 140 optionally comprises a forward mounting opening 146 (e.g., hole, slot, etc.). The forward mounting opening 146 is optionally coupled (e.g., rigidly, pivotally, etc.) to the rotational axis 147 of the associated closing wheel 220, such as by a fastener (not shown). The forward mounting opening 146 is optionally provided in a forward portion of the support arm 140. The forward portion of the support arm 140 is optionally linked to a medial portion of the support arm 140 by a link 145. A medial mounting opening 144 is optionally provided in the medial portion; the opener 120 is optionally coupled (e.g., rollingly) to the medial mounting opening 144. The medial mounting opening 144 is optionally disposed lower than the forward mounting opening 146. A rotational axis 148 of the opener 120 extends through the opening 144 with the opener 120 optionally coupled to the medial mounting opening 144. In the direction of travel, the rotational axis 147 of the closing wheel 220 is forward of the rotational axis 148 of the opener 120. In the illustrated example, the opener 120 is rigidly coupled to the frame 110 such that the frame 110 and the opener 120 move together. A height of the frame 110 and the opener 120 are adjusted together by the gauge wheels 34.

Referring to FIG. 3, each support arm 140 (e.g., a rearward link 142 thereof) is optionally coupled (e.g., rigidly coupled, pivotally coupled, slidably coupled) to the frame 110. The left support arm 140-1 is optionally coupled to a leftward portion 112-1 of the frame 110. The right support arm 140-2 is optionally coupled to a rightward portion 112-2 of the frame 110. Mounting openings 111-1, 111-2 are optionally provided, respectively, in leftward and rightward portions 112-1, 112-2 for attaching trench closing structure such as one or more chains, flaps, rolling baskets, press wheels, closing discs, etc. The frame 110 is optionally disposed at a generally rearward end of the applicator assembly 100.

With continued reference to FIG. 3, the frame 110 optionally includes one or more forwardly-extending arms 113 (e.g., left arm 113-1 and right arm 113-2) which are optionally coupled (e.g., rigidly, pivotally) to the closing wheel subframe 210. For example, the arms 113 are optionally coupled to a subframe mount 150 as described in more detail below.

With further reference to FIG. 3, in some examples, the subframe mount 150 is mounted (e.g., by fasteners such as bolts) to the subframe 210. In some examples, the subframe mount 150 includes left and right plates 152-1, 152-2 which are disposed adjacent to (e.g., flush with) sidewalls of the subframe 210. Each plate 152 is optionally coupled to the subframe 210 using one or more mounting openings 153 (e.g., 153-1 and 153-2, two openings on each plate 152). The subframe mount 150 optionally includes rearwardly-extending arms 154-1, 154-2 which are optionally coupled (e.g., rigidly, pivotally, etc.) to forwardly extending arms 113-1, 113-2, respectively, such as by fasteners 155-1, 155-2, respectively. Each fastener 155 optionally extends at least partially through corresponding mounting openings (e.g., slot, hole, etc.) provided in the associated arms 154, 113.

In operation, as the planter row unit 10 moves forward it opens a seed trench and deposits a plurality of seeds in the seed trench. The closing wheel assembly 200 moves at least some displaced soil back into the seed trench. The openers 120 open one or more liquid trenches in the soil adjacent to the seed trench (e.g., spaced from the seed trench by less than 3 inches, less than 2 inches, less than 1 inch, etc.). Each applicator 310 is optionally disposed rearward of an associated opener 120 and optionally directs fluid into or adjacent to the liquid trench opened by the associated opener.

Referring to FIGS. 13-16, another example of a liquid applicator assembly 1300 is illustrated. The liquid applicator assembly 1300 optionally includes a first mounting portion 1310 mounted (e.g., removably mounted such as by bolts or other fasteners) to the closing wheel subframe 210. The liquid applicator assembly 1300 optionally includes a second mounting portion 1320 which is optionally adjustably (e.g., pivotally, slidingly, translatably) coupled to the first mounting portion 1310. In some examples, a position of the second mounting portion 1320 is adjustable (e.g., pivotally about a pivot connection 1312 coupling the first and second mounting portions 1310, 1320). In some examples, the position of the second mounting portion 1320 is selectively retainable (e.g., by tightening or otherwise securing pivot connection 1312) in one or a plurality of positions. As will be seen upon further description of some examples of the assembly 1300, adjustment of a position of the second mounting portion 1320 optionally adjusts a depth to which one or more opener features (e.g., opener discs, opener knives, coulters, etc.) extends into the soil.

In some examples, one or more openers 120 (or other opener features) are at least partially supported (e.g., rollingly supported) on a support arm 1340. In some examples, the support arm 1340 is supported (e.g., pivotally supported) on the axis of an adjacent closing wheel 220. In some examples, the support arm 1340 extends generally rearwardly from the axis of closing wheel 220. In some examples, a support arm 1330 couples (e.g., rigidly couples, flexibly couples, etc.) the support arm 1340 (e.g., a rearward end thereof) to the second mounting portion 1320 (e.g., a side surface thereof). In the illustrated example, the support arm 1330 first extends laterally outwardly from the second mounting portion 1320 and extends downwardly toward the support arm 1340 such that the support arm 1330 has an angled (e.g., arcuate, curved, etc.) profile.

In some examples, one or more applicators 1337 are supported on the applicator assembly 1300. In one example, the applicators 1337 may be referred to as dribble application conduits 1337 (e.g., flexible conduits, rigid conduits, etc.). In some examples, each conduit 1337-1, 1337-2 is disposed to deposit liquid in or adjacent to a trench opened by an associated opener 120-1, 120-2. In some examples, as may be seen in FIG. 14, the conduits 1337-1, 1337-2 optionally have a terminal end disposed near (e.g., slightly above, at, or slightly below) the bottom of an associated opener 120-1, 120-2. In examples including flexible conduits 1337 (e.g., dribble tubes), at least a portion of the conduit may be dragged along the bottom of the trench opened by the opener 120 during operation. In various examples or implementations, one or more the openers 120 may be disposed at a height relative to the associated closing wheel 220 such that a depth of the liquid trench opened by the opener is less than 3 inches, 2 inches, about 2 inches, less than 1 inch, about 1 inch, between 0.5 inches and 1 inch, between 0 and 2 inches, between 0 and 1 inches, about 0.75 inches, between 0.6 and 0.9 inches, between 0.7 and 0.8 inches, etc.

It should be appreciated that the conduits 1337-1, 1337-2 may include other features such as spray nozzles, valves, orifices, etc. for manipulating (e.g., directing, diverting, controlling, stopping, starting, etc.) the flow of liquid (e.g., fertilizer, liquid fertilizer, nitrogen, a solution including nitrogen, a solution including sodium, starter fertilizer, pop-up fertilizer, etc.). In some examples, one or more sensors 1338-1, 1338-2 (e.g., flow rate sensors, etc.) may be used to measure characteristics of fluid flow through and/or from the conduits 1337-1, 1337-2.

In some examples, one or more conduits 1337-1, 1337-2 are at least partially supported on an associated support arm 1330 (e.g., respectively 1330-1, 1330-2). In some examples, conduits 1337-1, 1337-2 are attached to and/or extend at least partially through a respective conduit support 1335-1, 1335-2, which may be, in some examples, supported on or unitarily formed as a part of the support arms 1330-1, 1330-2. The conduit supports 1335-1, 1335-2 optionally support the respective conduit 1330-1, 1330-2 such that the conduits 1330-1, 1330-2 are oriented generally downwardly and rearwardly.

In some examples, the applicator assembly 1300 includes two openers 120-1, 120-2 disposed on either side of a seed trench opened by the row unit (e.g., spaced from a central vertical longitudinal plane of the row unit by one inch, two inches, less than two inches, less than three inches, etc.). The openers 120-1, 120-2, are optionally at least partially supported on associated support arms 1340-1, 1340-2, respectively. The support arms 1340-1, 1340-2 are optionally at least partially supported on support arms 1330-1, 1330-2, respectively, which are in turn optionally mounted to the second mounting portion 1320.

In operation, as the planter row unit 10 moves forward it opens a seed trench and deposits a plurality of seeds in the seed trench. The closing wheel assembly 200 moves at least some displaced soil back into the seed trench. The openers 120 open one or more liquid trenches in the soil adjacent to the seed trench (e.g., spaced from the seed trench by less than 3 inches, less than 2 inches, less than 1 inch, etc.). Each conduit 1337 is optionally disposed rearward of an associated opener 120 and optionally directs fluid into or adjacent to the liquid trench opened by the associated opener.

In some examples, one or more openers 120 (or other opener features) are flexibly supported on the applicator assembly 1300. In some examples, in operation, the support arms 1330 are resiliently flexible for bending in a first direction and inflexible for bending in a second direction. For example, the support arm 1330 may be flexible for bending its downwardly extending portion generally outboard relative to its laterally extending portion, while the support arm 1330 is less flexible (e.g., inflexible, semi-rigid, nearly inflexible, inflexible under normal operating conditions, etc.) for bending its downwardly extending portion generally rearwardly relative to the laterally extending portion. Thus, in such examples, the opener 120 may be permitted to "drift" or "wag" laterally in an inboard or outboard direction, but prevented (or substantially prevented or inhibited) from displacement in a vertical plane (e.g., from generally upward displacement which would reduce the depth to which disc penetrates the soil in some examples).

Finishing Devices

Figure 10:
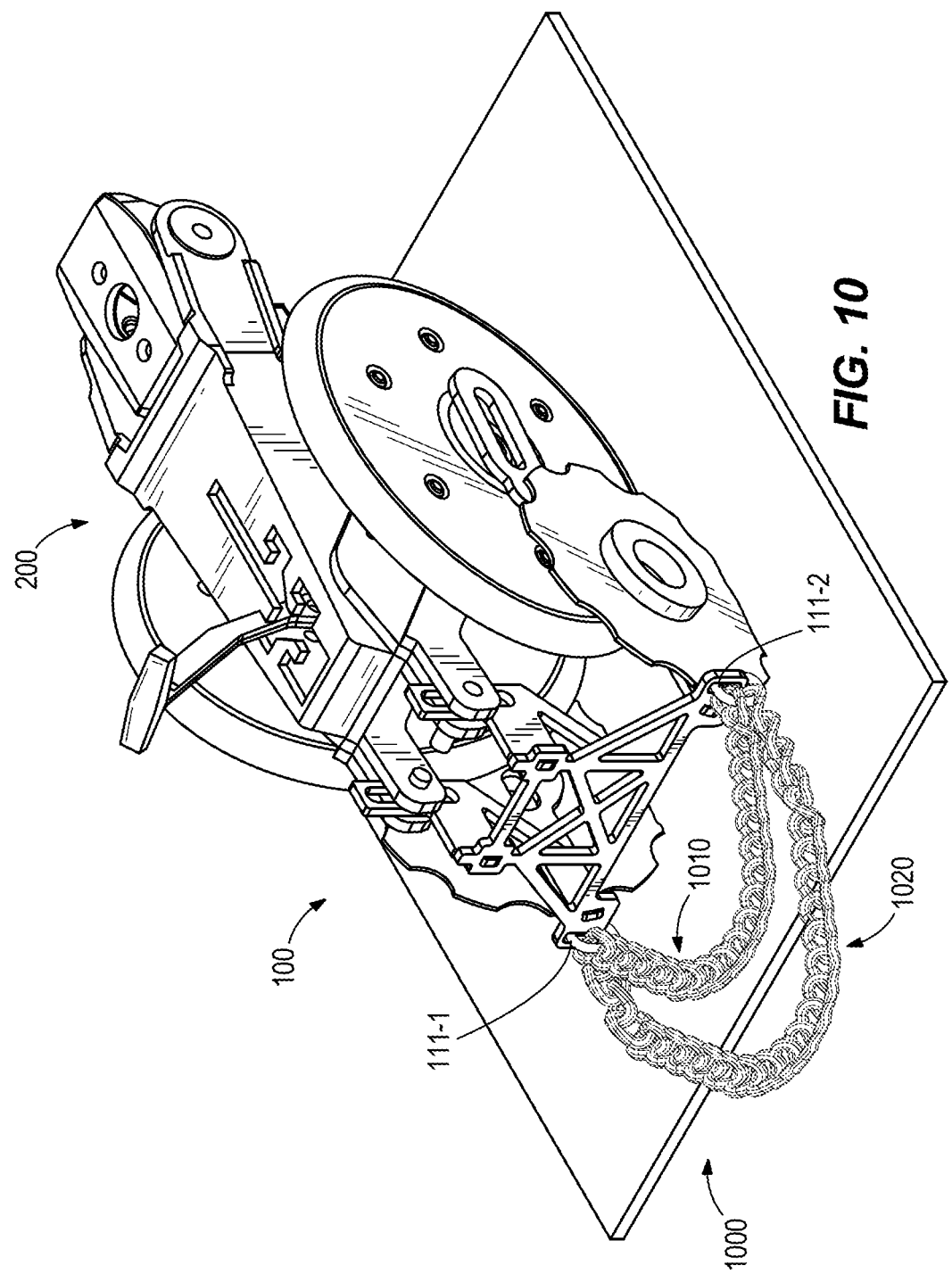
FIG. 10 is a top, rear perspective view of one example of a chain assembly mounted to one example of a closing wheel assembly.

Referring to FIG. 10, in some examples, a finishing device 1000 is optionally mounted to the frame 110. In one example, the finishing device 1000 is a chain assembly 1000 containing one or more chains The chain assembly 1000 optionally includes a first chain 1010 and second chain 1020 disposed to rest on top of the seed trench. The chain 1010 is optionally attached at a first end (e.g., with a selectively releasable coupler such as a spring snap) to mounting opening 111-1 and is optionally attached at a second end (e.g., with a selectively releasable coupler such as a spring snap) to mounting opening 111-2. The chain 1020 is optionally attached at a first end (e.g., with a selectively releasable coupler such as a spring snap) to mounting opening 111-1 and is optionally attached at a second end (e.g., with a selectively releasable coupler such as a spring snap) to mounting opening 111-2. Both chains 1010, 1020 optionally contact soil adjacent to (e.g., above) the seed trench during operation.

Figure 11:
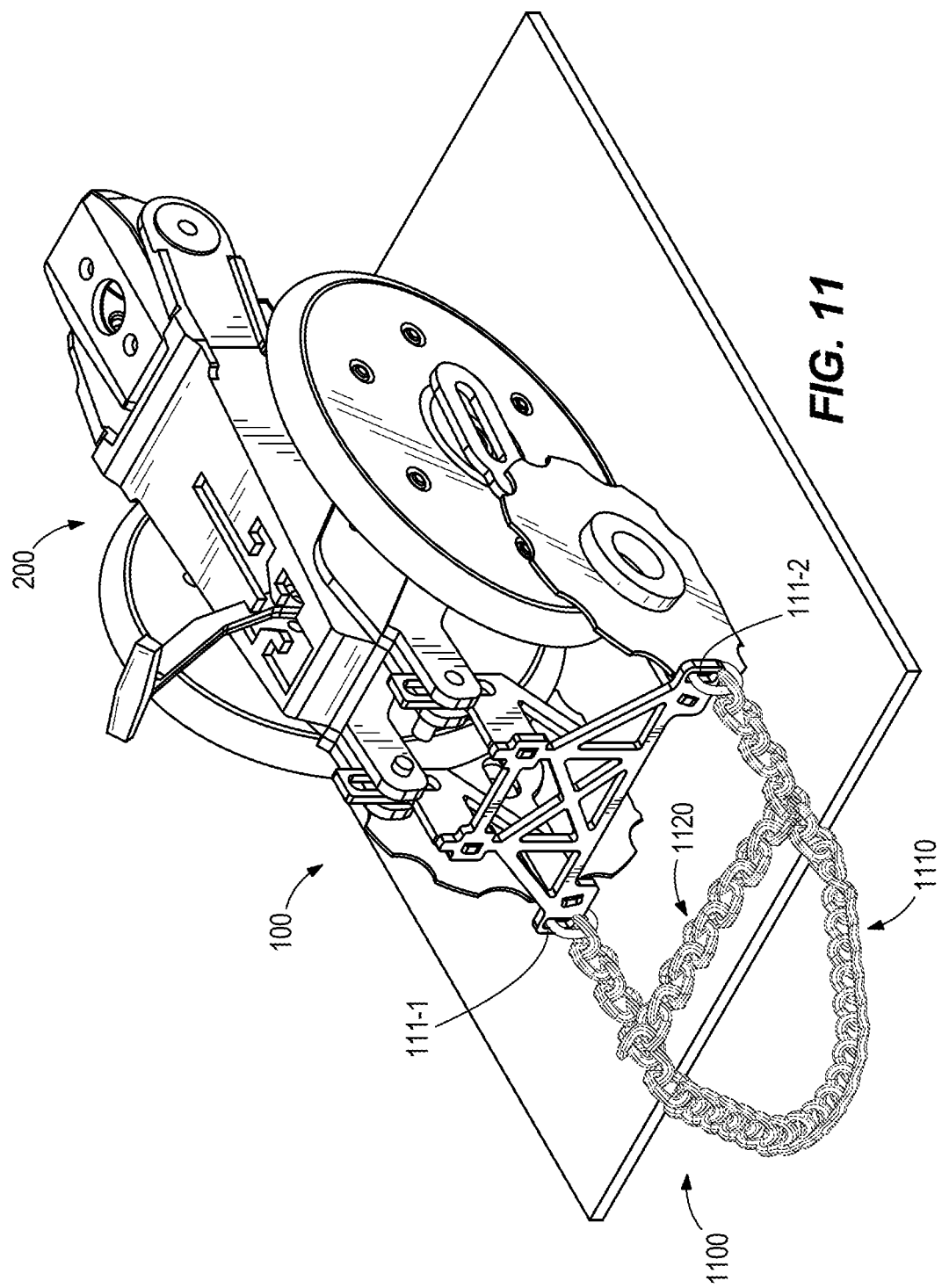
FIG. 11 is a top, rear perspective view of one example of a chain assembly mounted to one example of a closing wheel assembly.

Referring to FIG. 11, in some examples, a finishing device 1100 is optionally mounted to the frame 110. In one example, the finishing device 1000 is a chain assembly 1100. The chain assembly 1100 includes a first chain 1110 coupled to frame 110 and a second chain 1120 coupled (e.g., releasably coupled) at a first end to a left-side length of chain 1110 and coupled (e.g., releasably coupled) at a second end to a right-side length of chain 1110. The chain 1110 is optionally attached at a first end (e.g., with a selectively releasable coupler such as a spring snap) to mounting opening 111-1 and is optionally attached at a second end (e.g., with a selectively releasable coupler such as a spring snap) to mounting opening 111-2. Both chains 1110, 1120 optionally contact soil adjacent to (e.g., above) the seed trench during operation.

Figure 12:
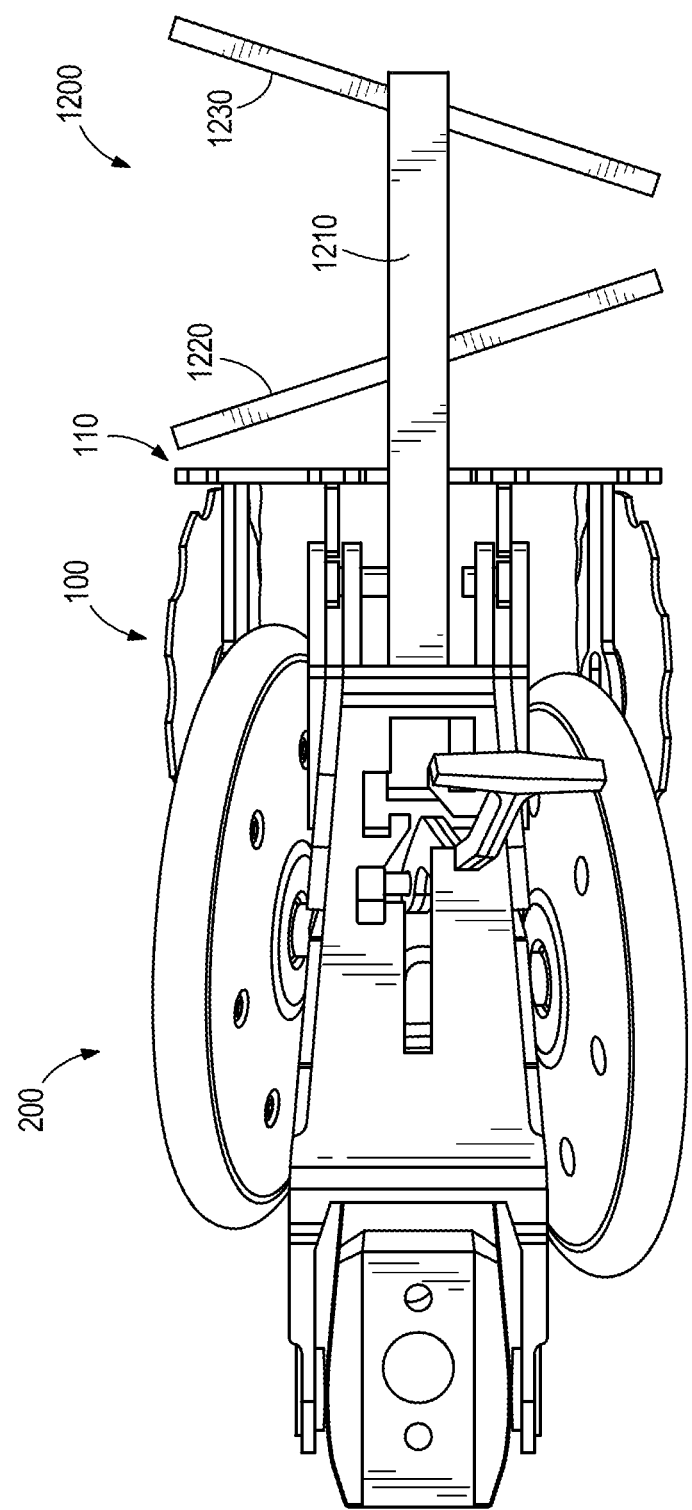
FIG. 12 is a top view of one example of a finishing assembly and one example of an applicator assembly mounted to one example of a closing wheel assembly.
Figure 13:
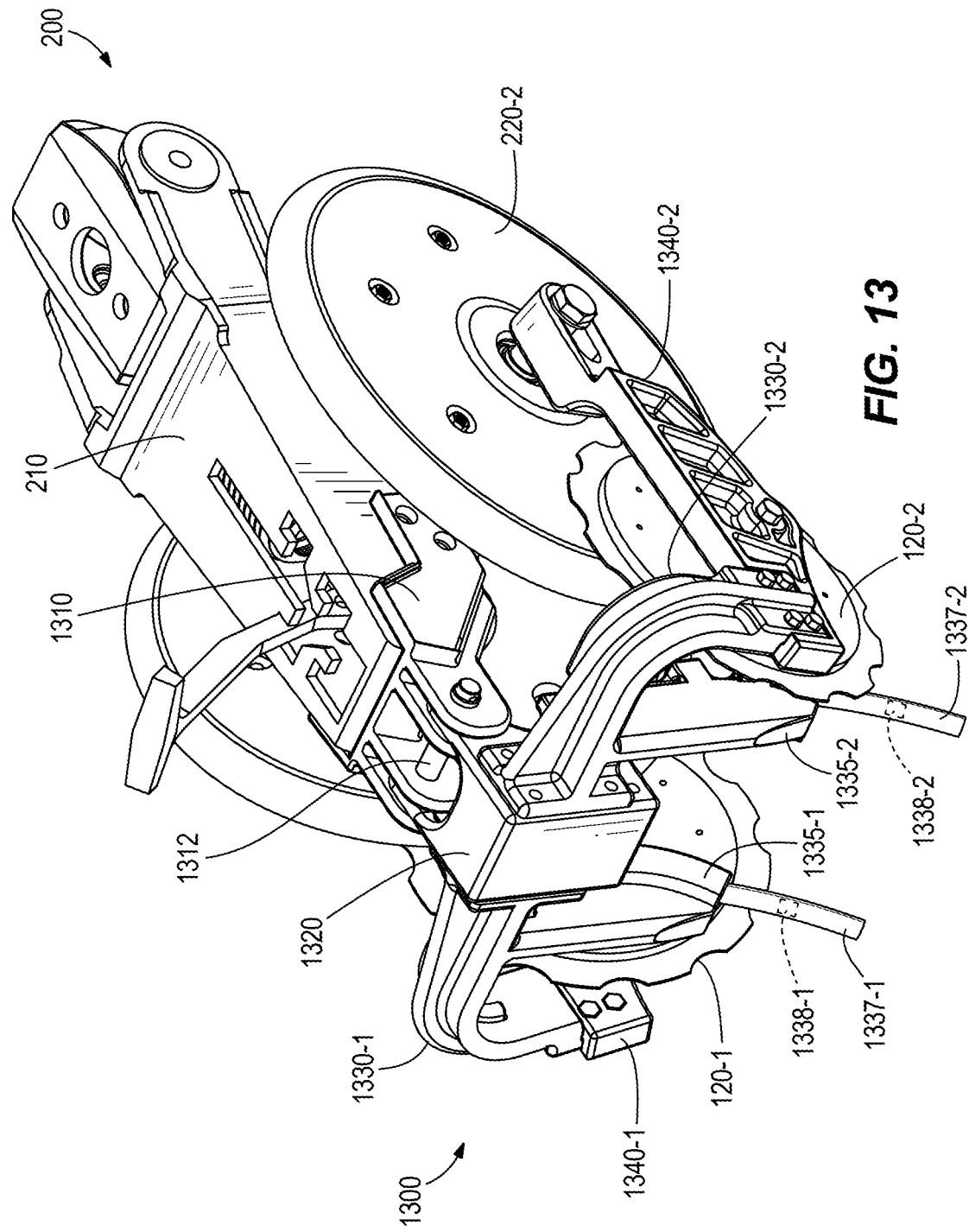
FIG. 13 is a top, rear perspective view of one example of an applicator assembly mounted to one example of a closing wheel assembly.
Figure 14:
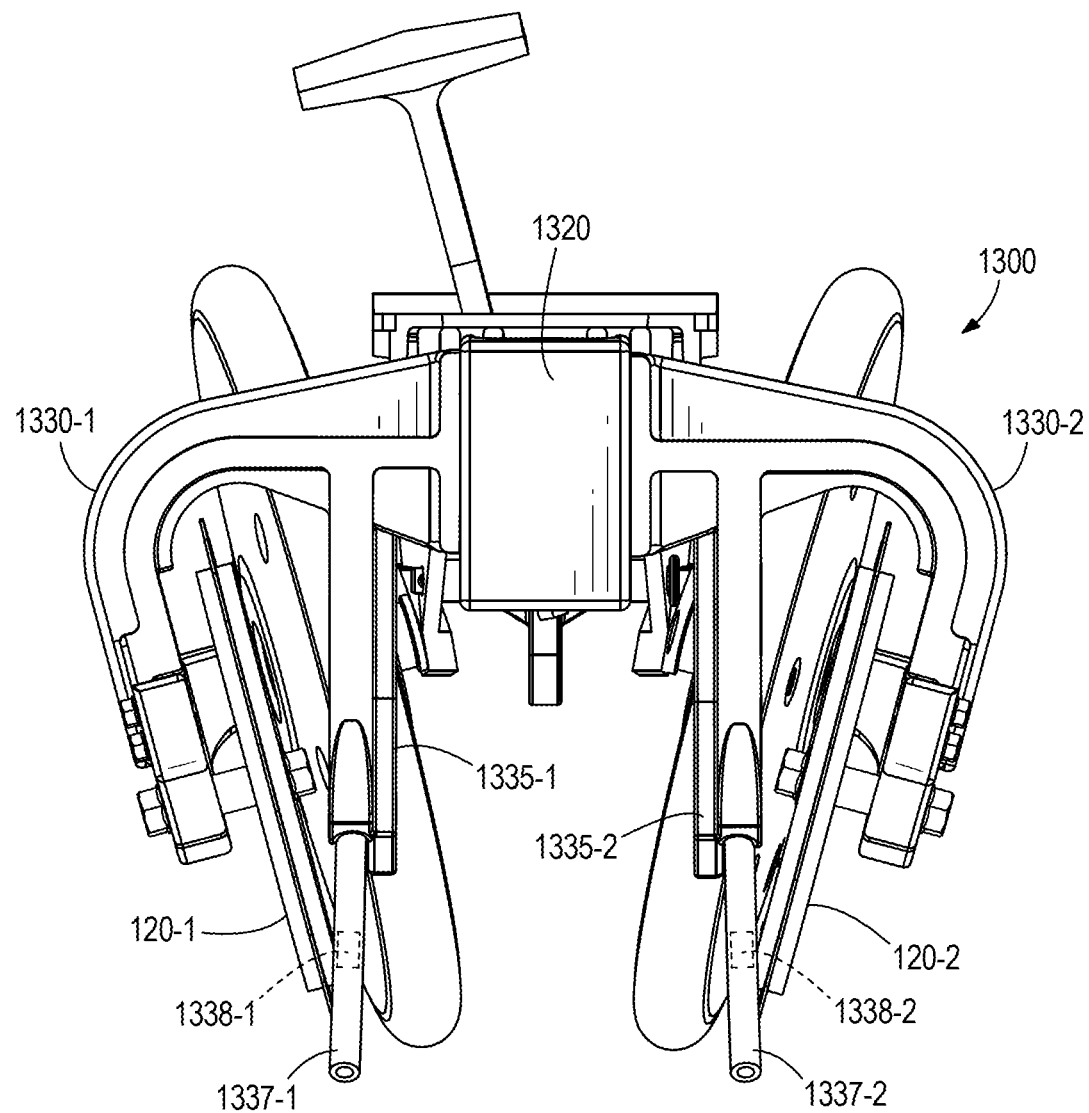
FIG. 14 is a rear elevation view of at least a portion of the applicator assembly and at least a portion of the closing wheel assembly of FIG. 13.
Figure 15:
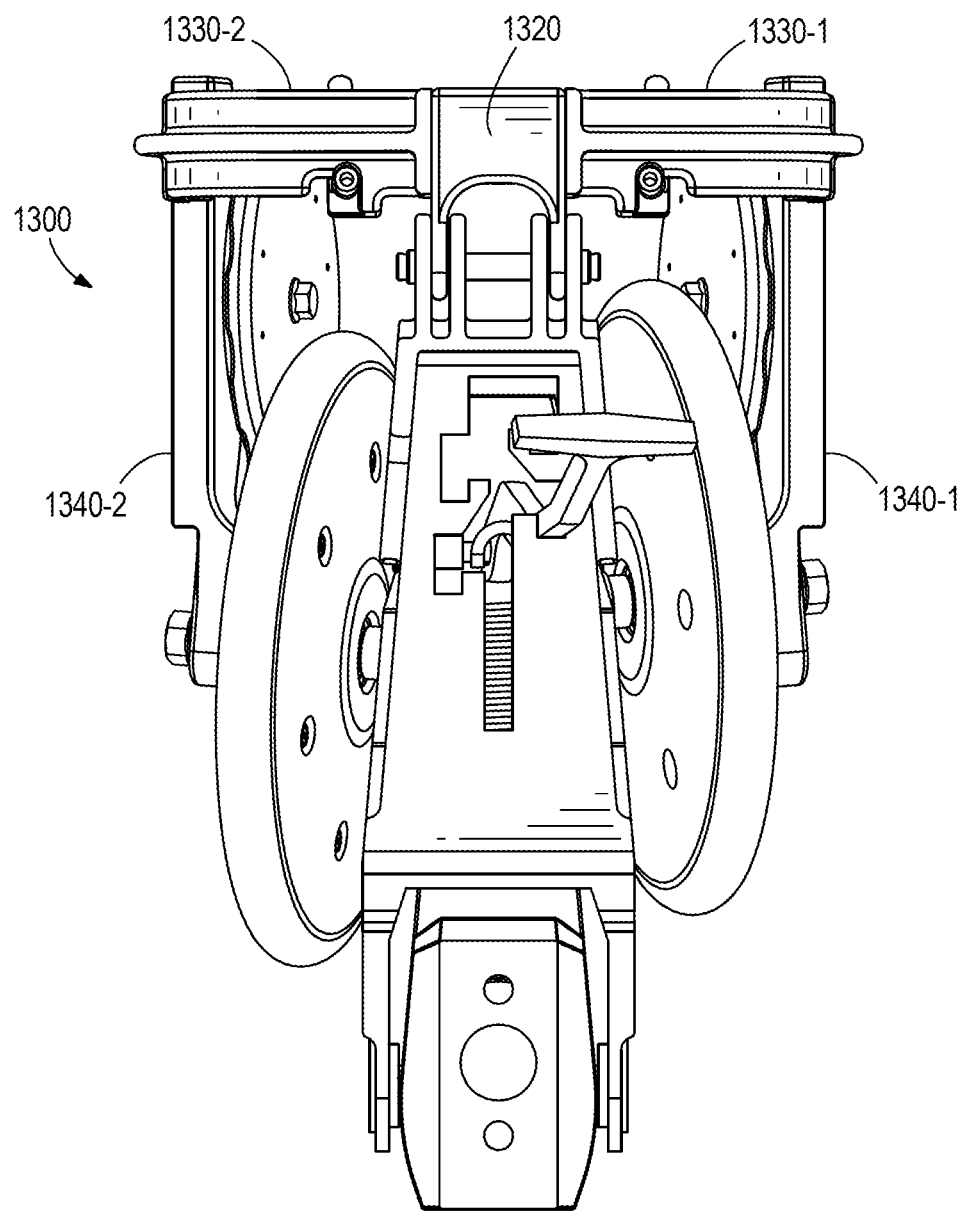
FIG. 15 is a top view of at least a portion of the applicator assembly and at least a portion of the closing wheel assembly of FIG. 13.
Figure 16:
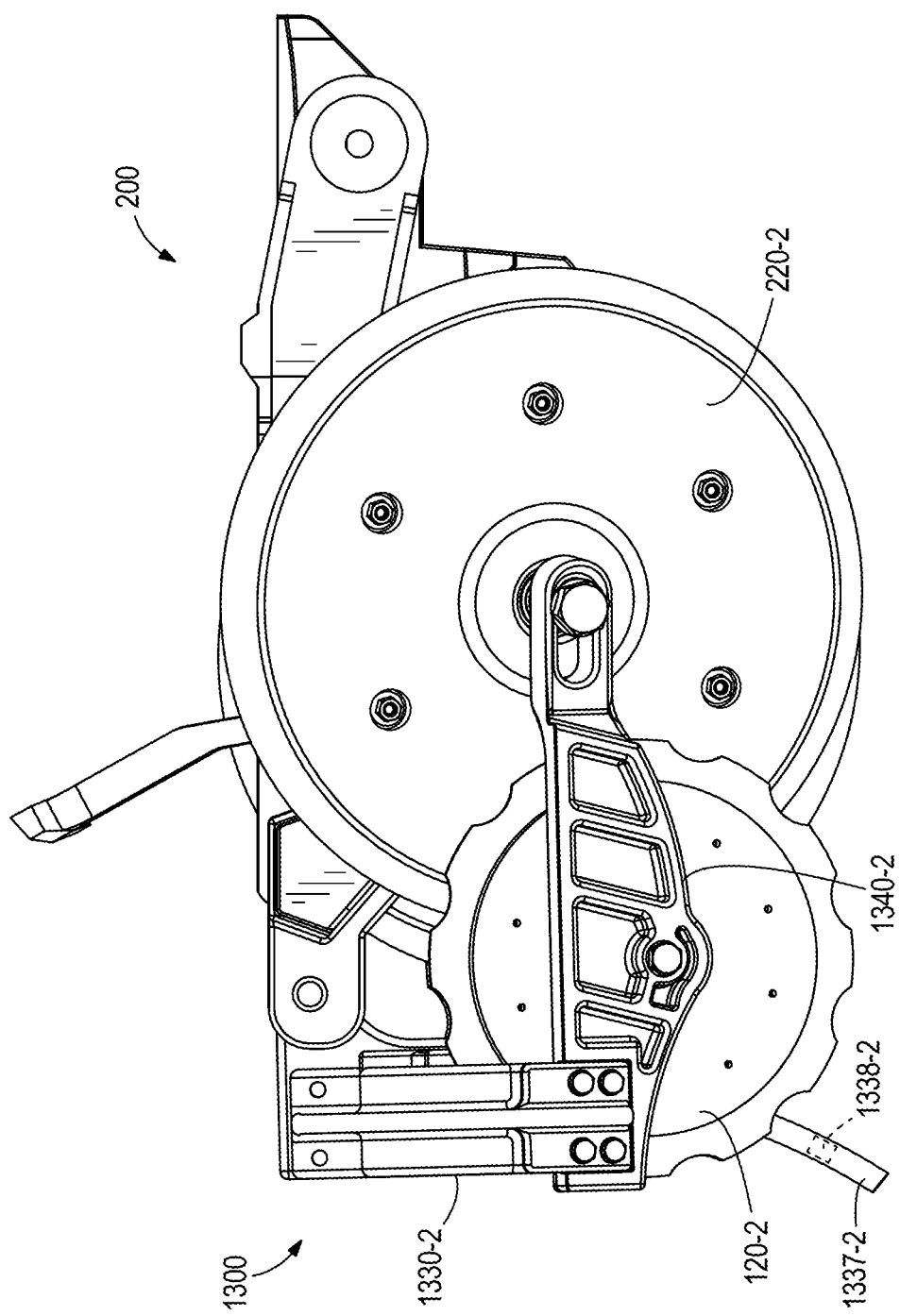
FIG. 16 is a side elevation view of at least a portion of the applicator assembly and at least a portion of the closing wheel assembly of FIG. 13.
Figure 17:
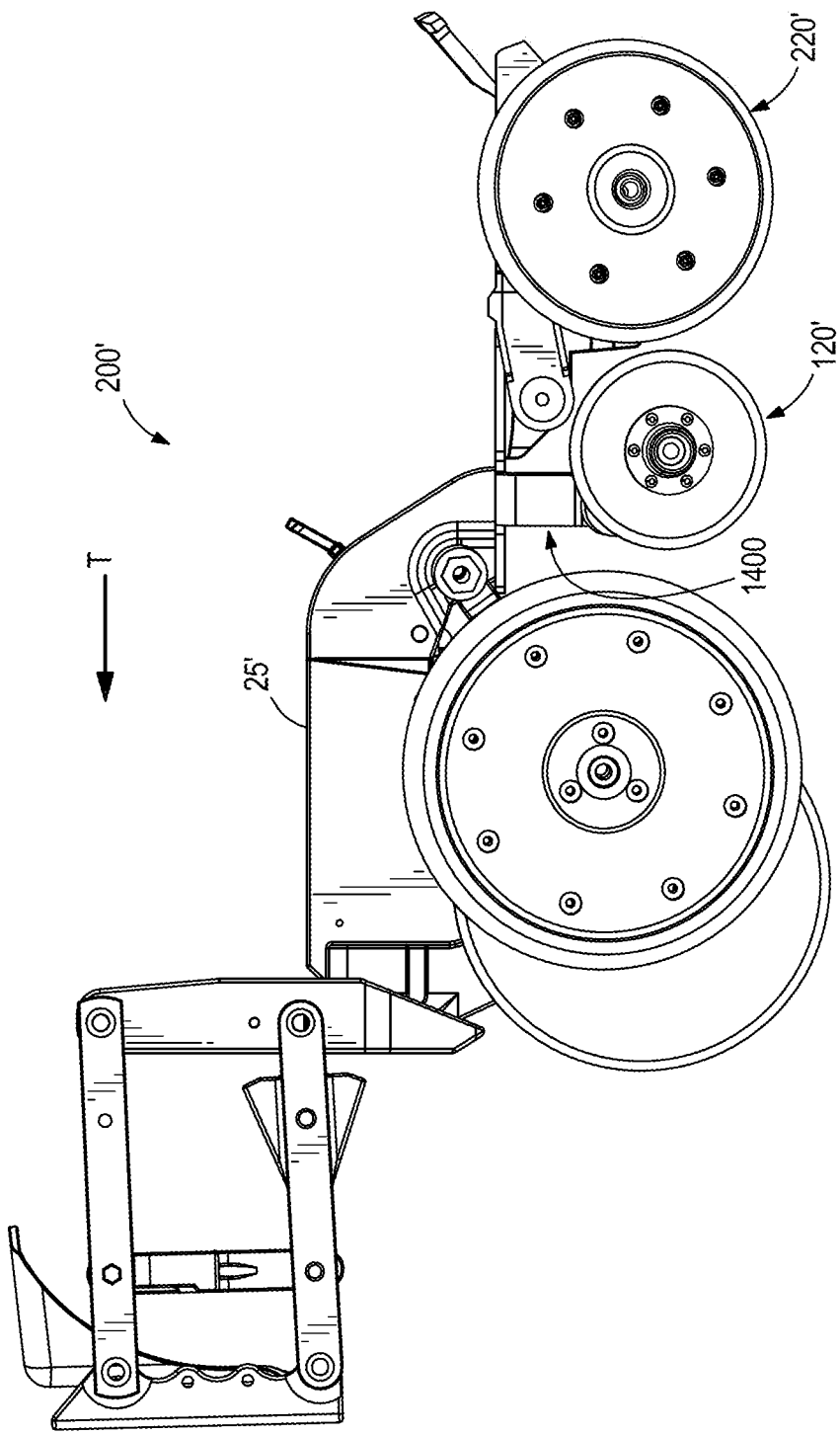
FIG. 17 is a side elevation view of one example of a planter row unit.
Figure 18:
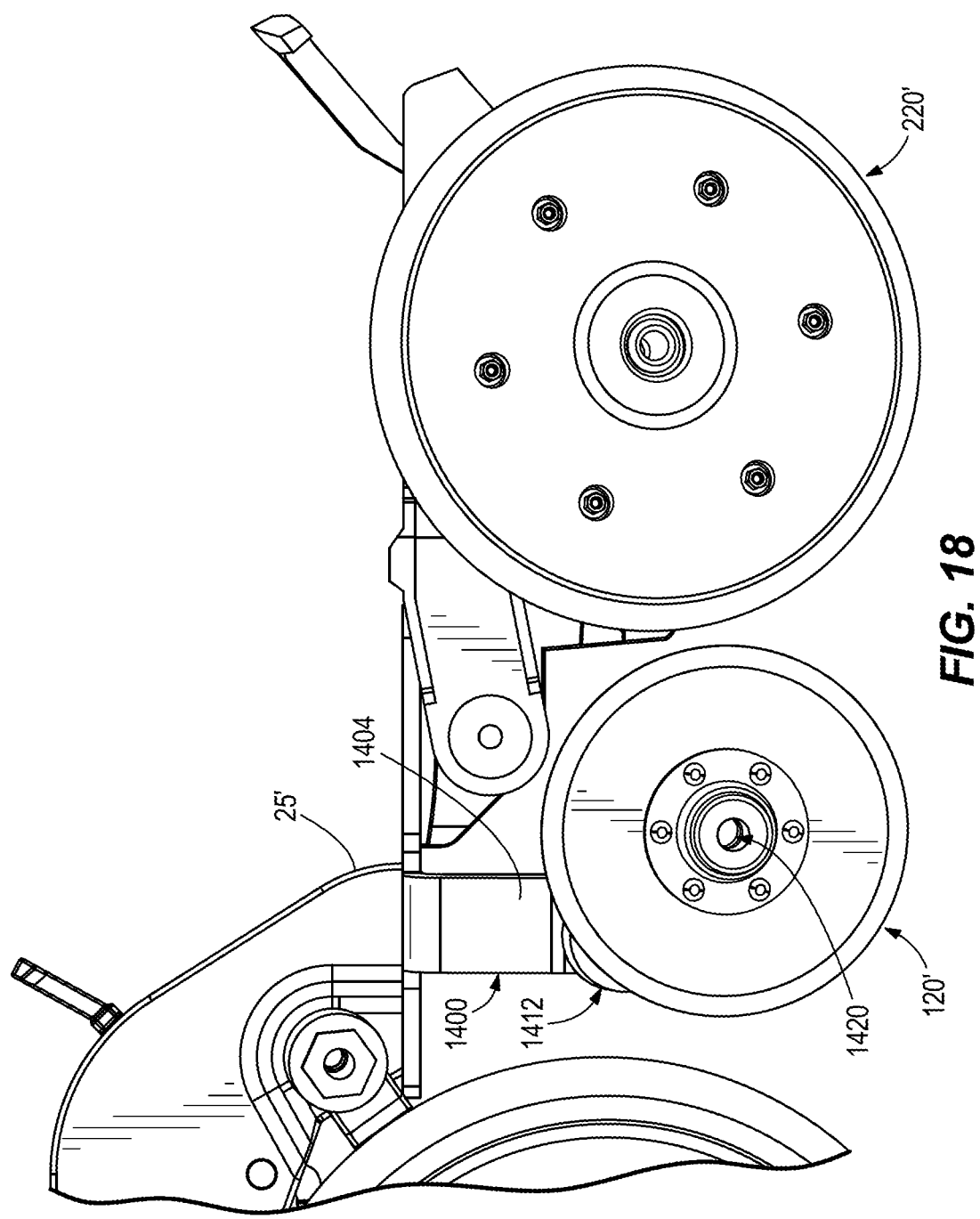
FIG. 18 is a side elevation view of one example of a planter row unit.
Figure 20:
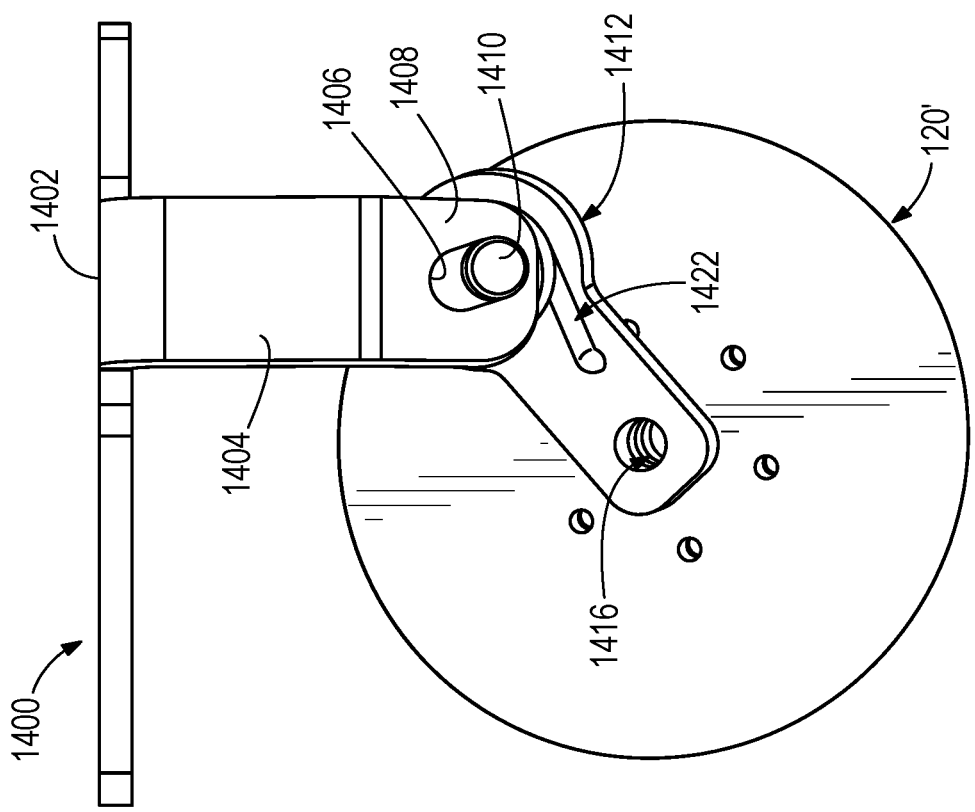
FIG. 20 is a right side elevation view of the opener of FIG. 19.
Figure 19:
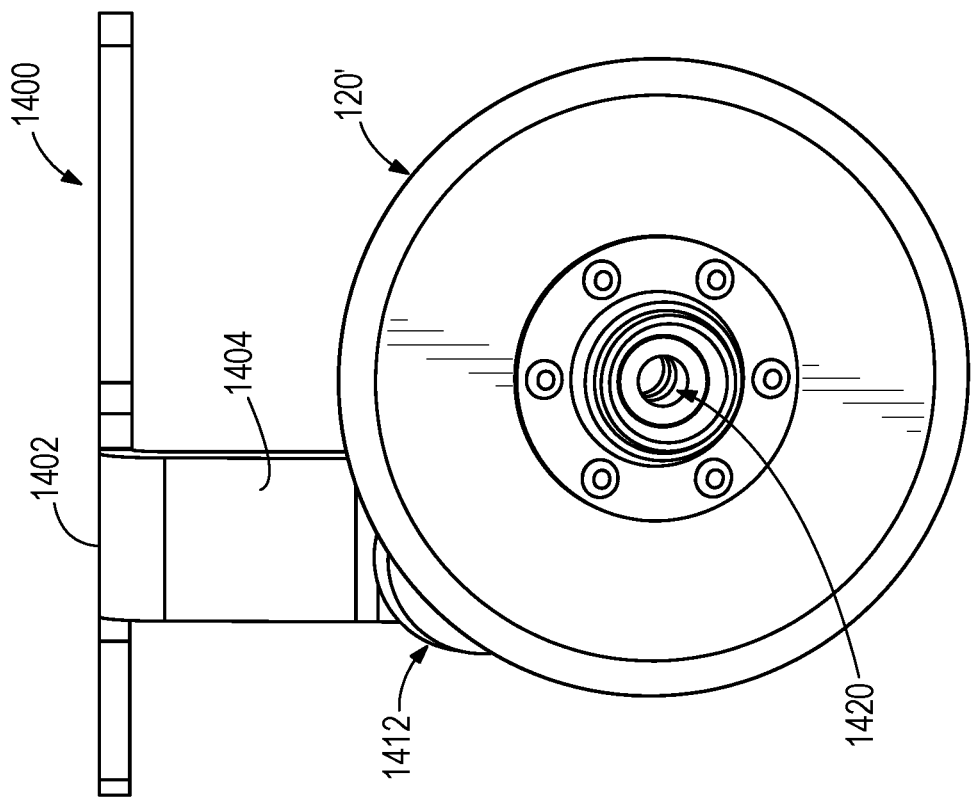
FIG. 19 is a left side elevation view of one example of an opener of the planter row unit of FIG. 17.
Figure 23:
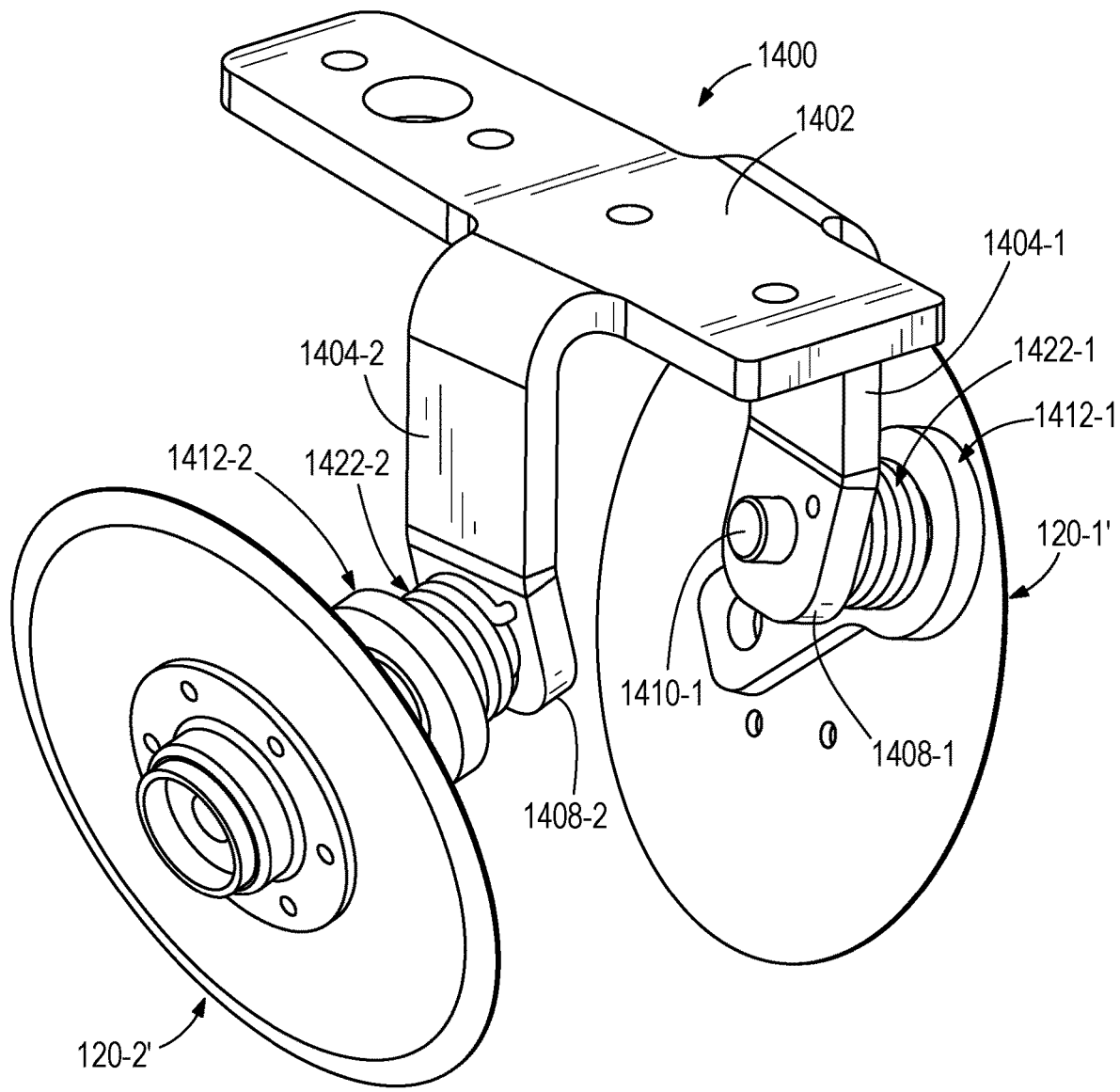
FIG. 23 is a top, rear perspective view of the portion of the planter row unit of FIG. 17.
Figure 24:
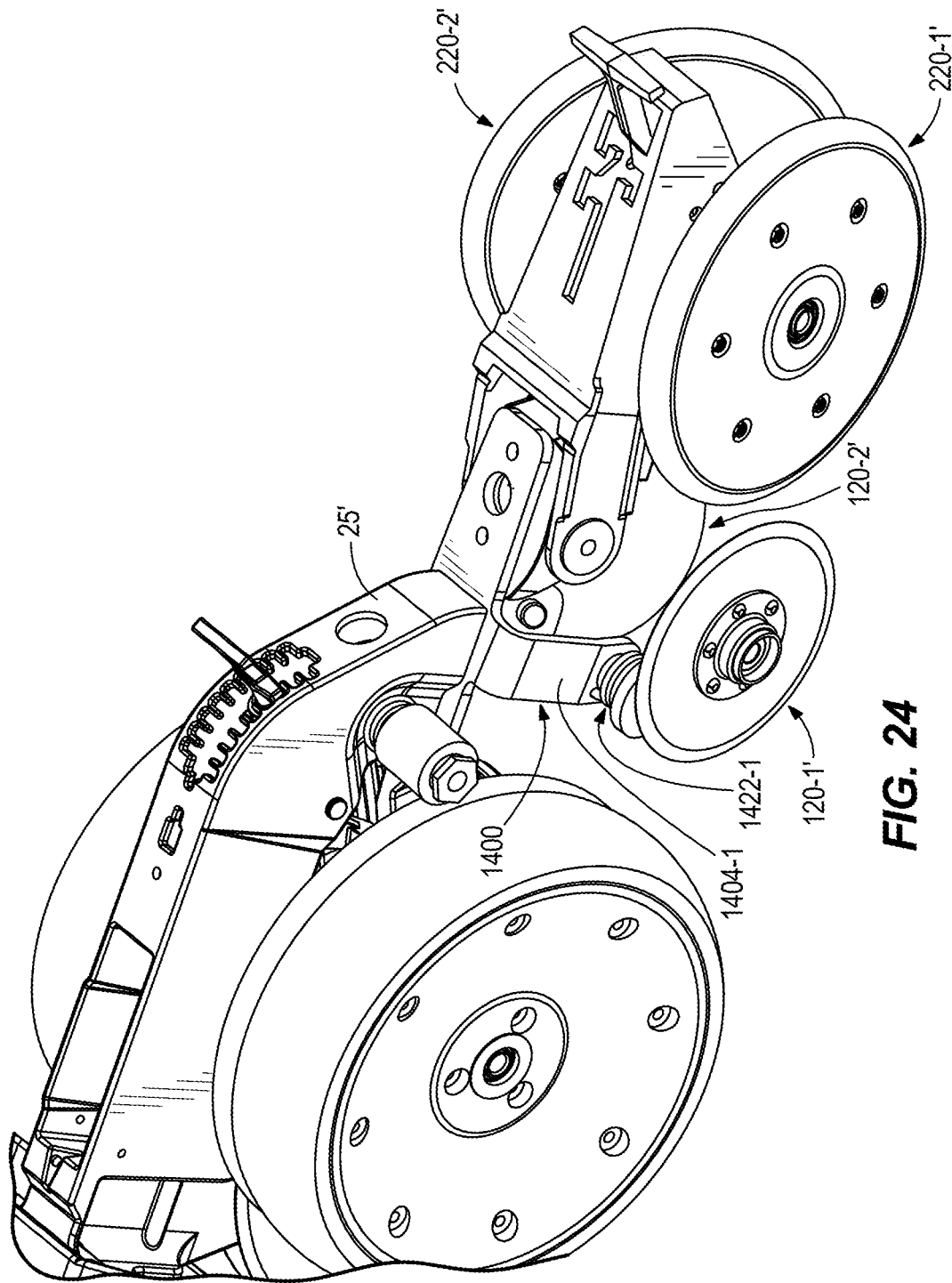
FIG. 24 is a top, rear perspective view of the planter row unit of FIG. 17.
Figure 25:
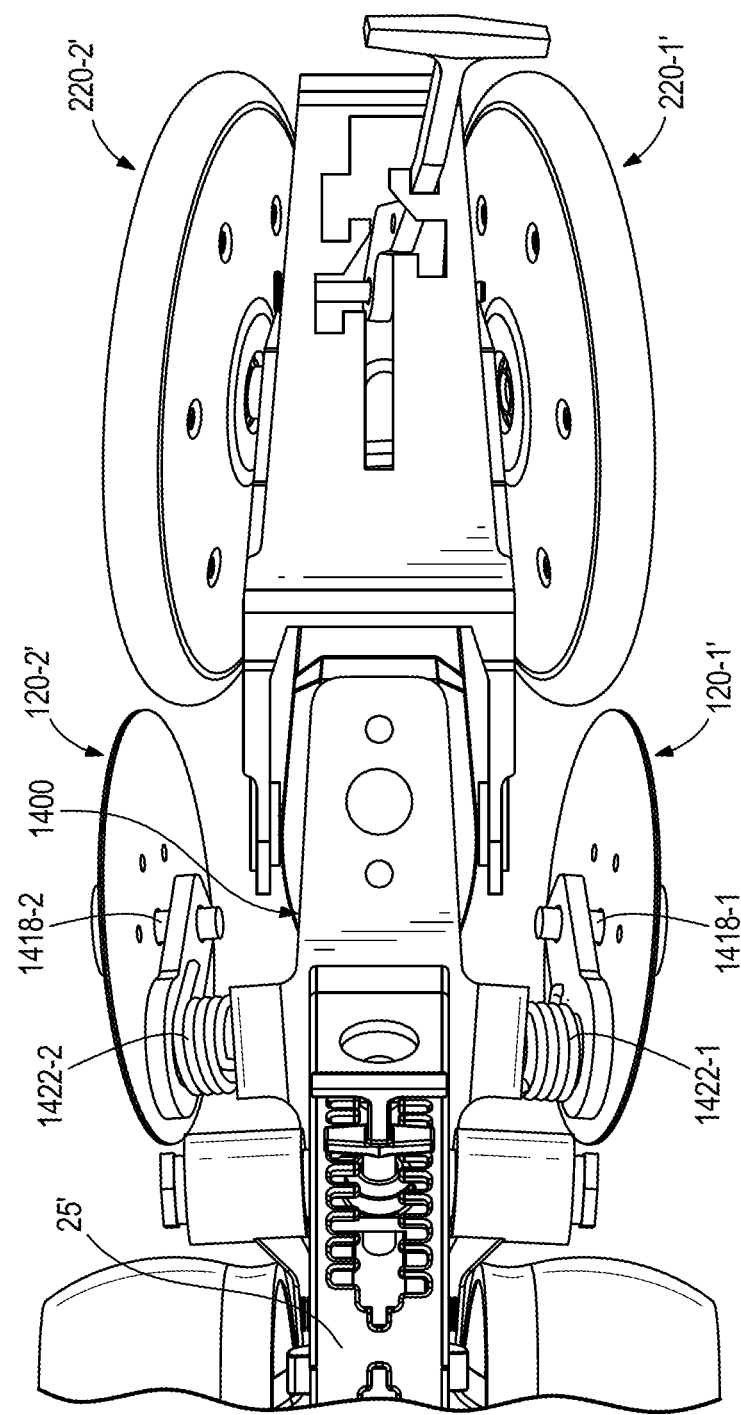
FIG. 25 is a top view of the planter row unit of FIG. 17.
Figure 26:
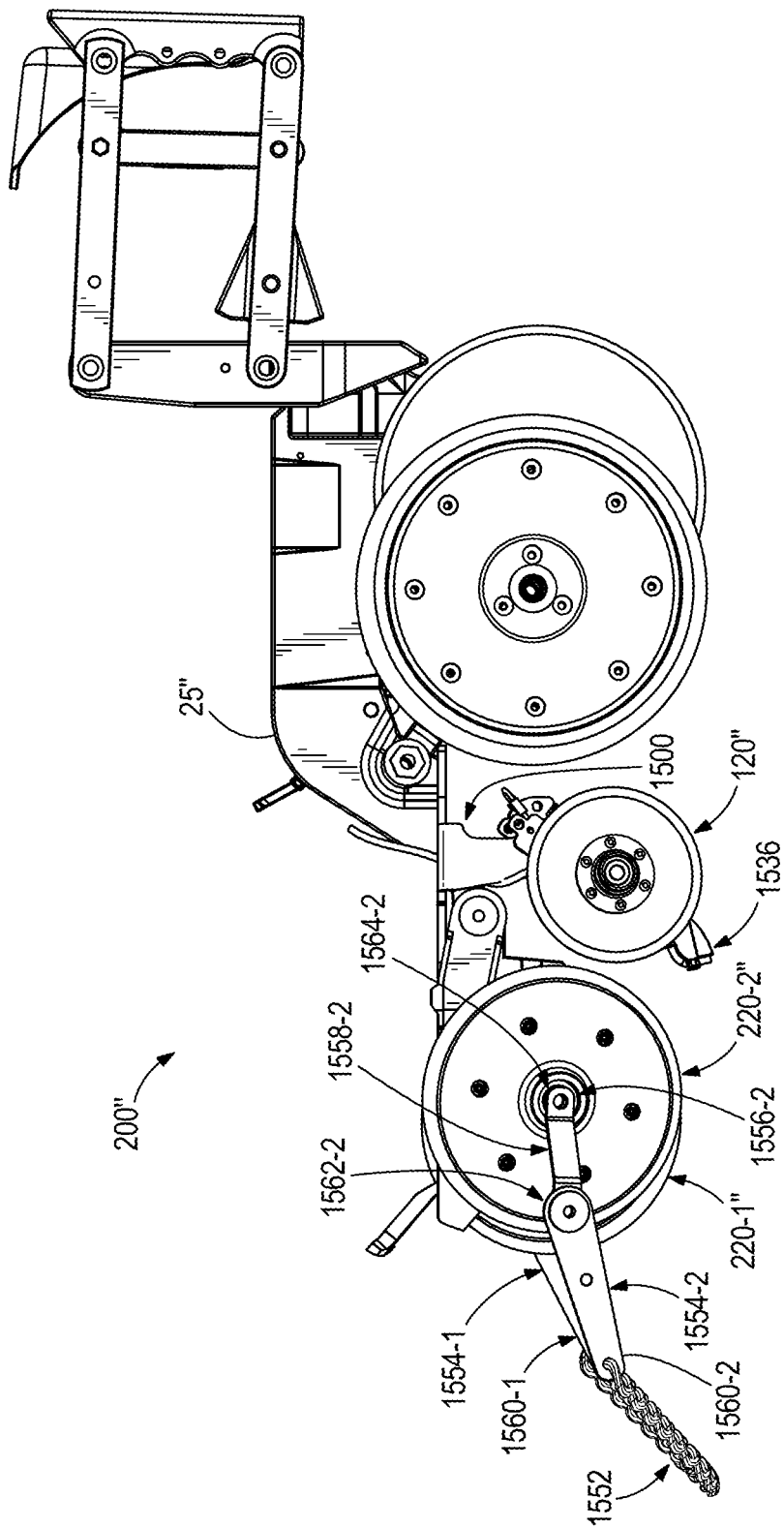
FIG. 26 is a side elevation view of one example of a planter row unit.
Figure 27:
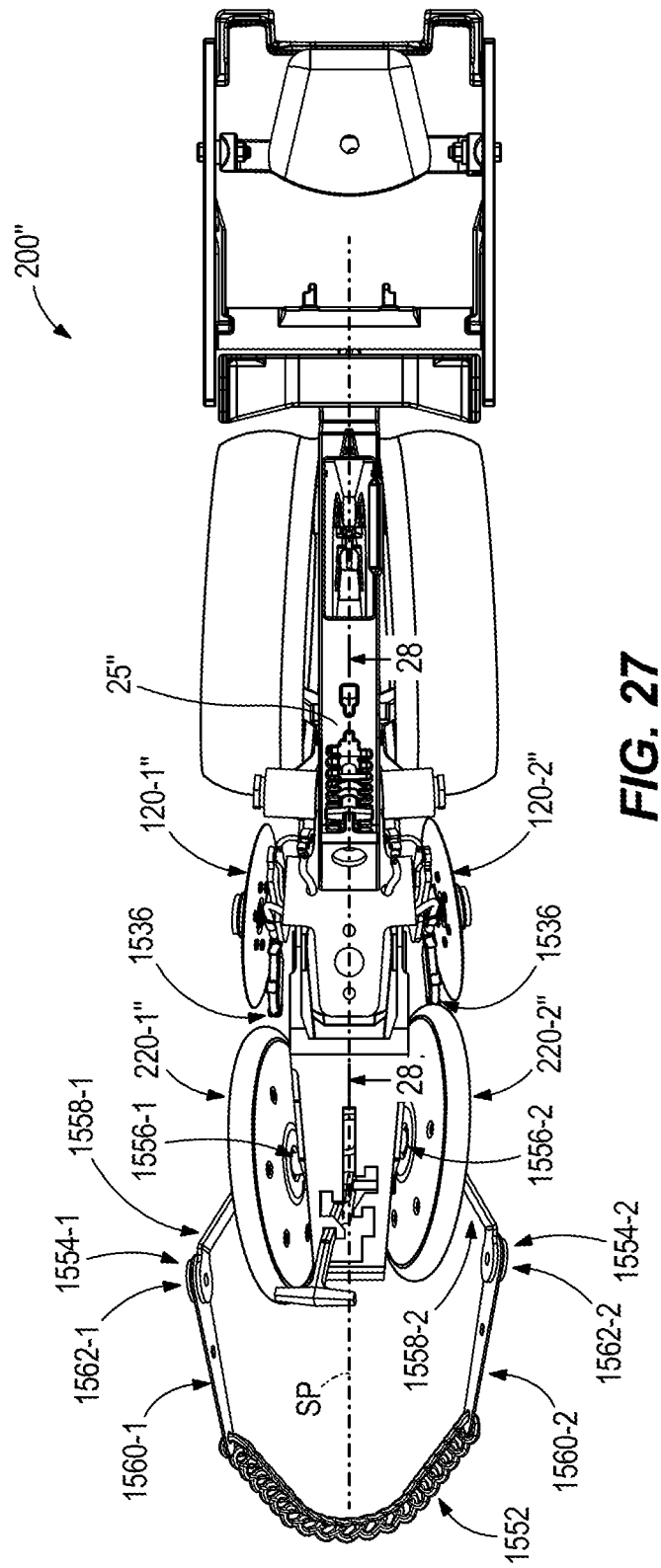
FIG. 27 is a top view of the planter row unit of FIG. 26.
Figure 28:
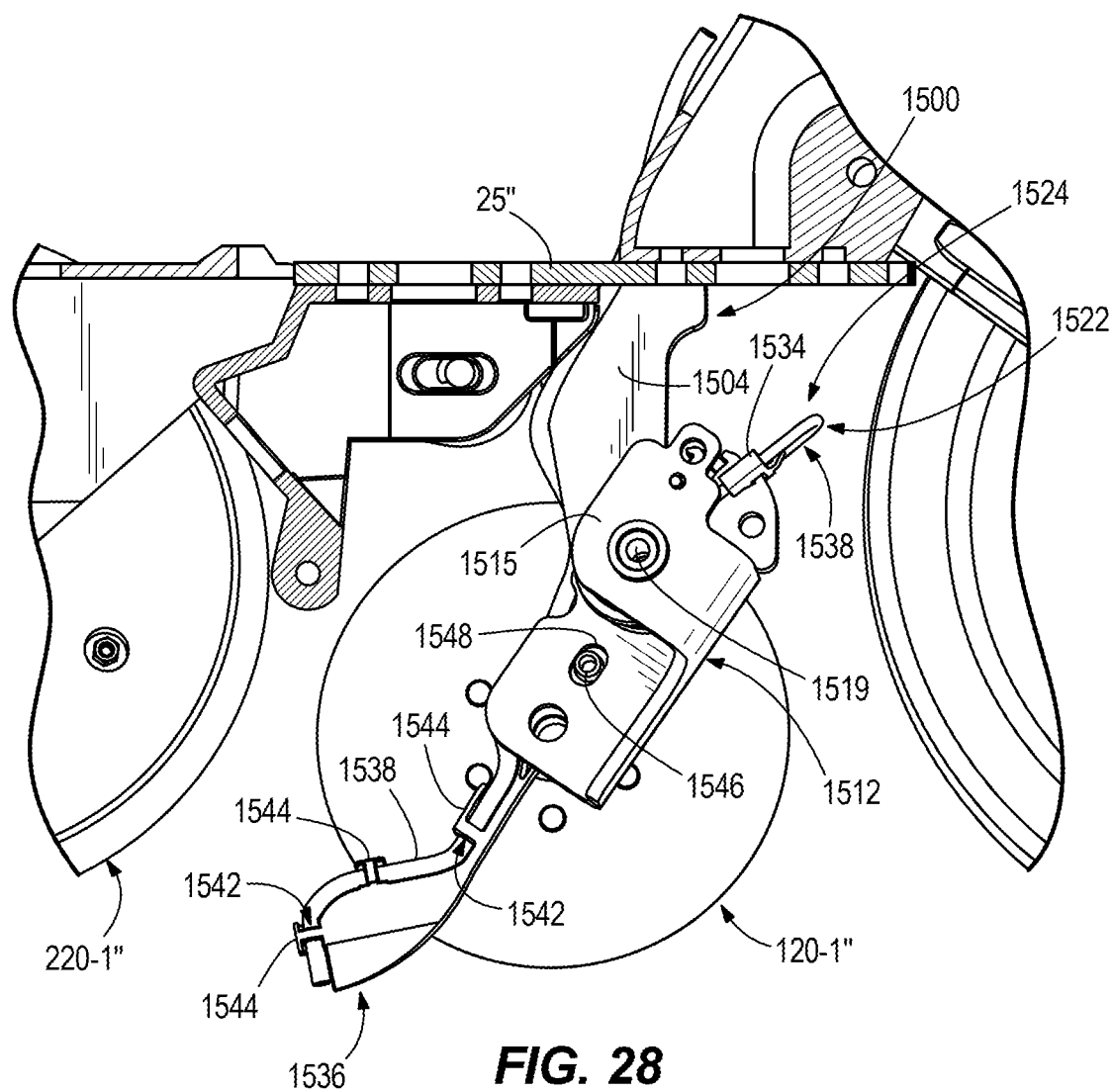
FIG. 28 is a cross-sectional view taken along line 28-28 in FIG. 27.

Referring to FIG. 12, in some examples, a finishing device 1200 is optionally mounted to the frame 110. In one example, the finishing device 1200 is one or more closing brushes (which may be referred to as finishing brushes) that may be disposed to contact (e.g., finish, close, etc.) soil above and/or adjacent to the seed trench. In some examples, the finishing device 1200 includes one or more brushes (and/or flaps or other soil finishing devices) mounted to an arm 1210. The arm 1210 may be coupled (e.g., rigidly coupled, pivotally coupled) to the frame 110 or to another component of the applicator assembly 100 or closing wheel assembly 200. The arm 1210 is optionally downwardly biased (e.g., by a spring, by an actuator, by deformation of the arm 1210 itself, etc.) such that the brush or brushes mounted to the arm 1210 resiliently contact the soil in operation. In some examples, a first brush 1220 is supported on the arm 1210 and a second brush 1230 is supported on the arm 1210 rearward of the first brush 1220. In some examples, the brushes 1220, 1230 are angled relative to the lateral direction (e.g., normal to the travel direction); in some such examples, the brushes 1220, 1230 are divergently angled relative to one another as illustrated in FIG. 12. In other examples, the brushes 1220, 1230 are disposed parallel to the lateral direction and/or to one another or substantially perpendicular to the direction of travel or the seed trench. The brushes 1220, 1230 optionally comprise bristles (e.g., made of metal, nylon, polymer, hair, etc.) and/or flaps (e.g., made of polymer or other flexible material). In some examples, in operation, at least some material adjacent to the seed trench tends to be displaced generally to the left by the first brush 1220 and to the right by the second brush 1230.

Referring now to FIGS. 17-25, another example of a planter row unit 200' is illustrated. In this example, the openers 120' are optionally coupled to the subframe 25' forward of the closing wheels 220'. In one example, a bracket 1400 is optionally coupled to the subframe 25' and optionally includes a base 1402 engaged with and coupled to the subframe 25' with, for example, fasteners. The bracket 1400 optionally includes two spaced-apart descending flanges 1404 with each flange optionally defining a coupling aperture 1406 therein. Toward an end of the descending flanges 1404, each flange 1404 optionally has an angled portion 1408 converging toward each other. The coupling apertures 1406 are optionally defined in the angled portions 1408. A shaft 1410 is optionally coupled within each of the coupling apertures 1406. A first end of each shaft 1410 is optionally coupled to a respective coupling aperture 1406 while a second end of each shaft 1410 optionally extends externally of a respective one of the flanges 1404. The second end of each shaft 1410 is optionally secured to a coupling member 1412. Each coupling member 1412 optionally includes a shaft aperture 1414 for optionally coupling the shaft 1410 thereto and an opener aperture 1416 for optionally coupling to a respective one of the openers 120'. An opener shaft 1418 optionally couples to a central aperture 1420 in each opener 120' and the respective opener aperture 1416 defined in the coupling member 1412. A biasing member 1422 is optionally wrapped around each of the shafts 1410 and is optionally braced against and coupled to the coupling member 1412 and the descending flanges 1404. The shafts 1410 and the coupling members 1412 are optionally coupled in such a manner that the coupling members 1412 can move relative to the bracket 1400. More particularly, the coupling members 1412 can optionally rotate about the shafts 1410 relative to the bracket 1400. This movement allows the openers 120' to optionally move vertically relative to the bracket 1400 and the subframe 25. The biasing members 1422 optionally bias the openers 120' downward toward the ground. If one or both of the openers 120' contact a rock or other debris in the ground applying an upward force to the opener(s) 120', the one or both of the openers 120' can move vertically to ride over the rock or other debris without damaging the openers 120' or causing other portions of the planter row unit 200' to have to move vertically to accommodate for an elevation change. The upward vertical movement of the openers 120' push against the force applied by the biasing members 1422. When the upward force is removed, the biasing members 1422 bias the openers 120' back downward toward the ground. In this example, the openers 120' can move vertically independently of each other.

With reference to FIGS. 26-32, another example of a planter row unit 200" is illustrated. In this example, the openers 120" are optionally coupled to the subframe 25"

forward of the closing wheels 220". In one example, a bracket 1500 is optionally coupled to the subframe 25" and optionally includes a base 1502 engaged with and coupled to the subframe 25" with, for example, fasteners. The bracket 1500 optionally includes two spaced-apart descending flanges 1504 with each flange optionally defining a coupling aperture 1506 therein. In this example, the two flanges 1504 optionally converge toward each other as they extend further away from the base 1502. A shaft 1510 is optionally coupled within each of the coupling apertures 1506. The shafts 1510 optionally extend from both sides of the respective flange 1504. A first end 1509 of each shaft 1510 is optionally disposed to an interior of the respective flange 1504 and a second end 1511 of each shaft 1510 is optionally disposed to an exterior of the respective flange 1504. A coupling member 1512 is optionally coupled to each shaft 1510. Each coupling member 1512 is generally U-shaped and optionally includes a medial portion 1513, a first or interior flange 1515 extending from an interior end of the medial portion 1513, and a second or exterior flange 1517 extending from an exterior end of the medial portion 1513. Each of the interior and exterior flanges 1515, 1517 optionally define a shaft aperture 1519 therein for receiving a respective one of the first and second ends 1509, 1511 of the shaft 1510. Each of the exterior flanges 1517 of the coupling members 1512 also optionally define an opener aperture 1516 for optionally coupling to a respective one of the openers 120". An opener shaft 1518 optionally couples to a central aperture 1520 in each opener 120" and the respective opener aperture 1516 optionally defined in the coupling member 1512. A biasing member 1522 is optionally wrapped around each of the shafts 1510 and is optionally braced against and coupled to the respective coupling member 1512 and the bracket 1500. The shafts 1510 and the coupling members 1512 are optionally coupled in such a manner that the coupling members 1512 can move relative to the bracket 1500. In one example, the coupling members 1512 can optionally rotate about the shafts 1510 relative to the bracket 1500. In other examples, the coupling members 1512 and the associated shafts 1510 are optionally rigidly coupled and together may optionally rotate within the coupling apertures 1506 relative to the bracket 1500. Movement of the coupling members 1512 relative to the bracket 1500 allows the openers 120" to optionally move vertically relative to the bracket 1500 and the subframe 25". The biasing members 1522 optionally bias the openers 120" downward toward the ground. If one or both of the openers 120" contact a rock or other debris in the ground that applies an upward force to the opener(s) 120", the one or both of the openers 120" can move vertically to ride over the rock or other debris without damaging the openers 120" or causing other portions of the planter row unit 200" to have to move vertically to accommodate for an elevation change. The upward vertical movement of the openers 120" push against the force applied by the biasing members 1522. When the upward force is removed, the biasing members 1522 bias the openers 120" back downward toward the ground. In this example, the openers 120" can move vertically independently of each other.

Figure 29:
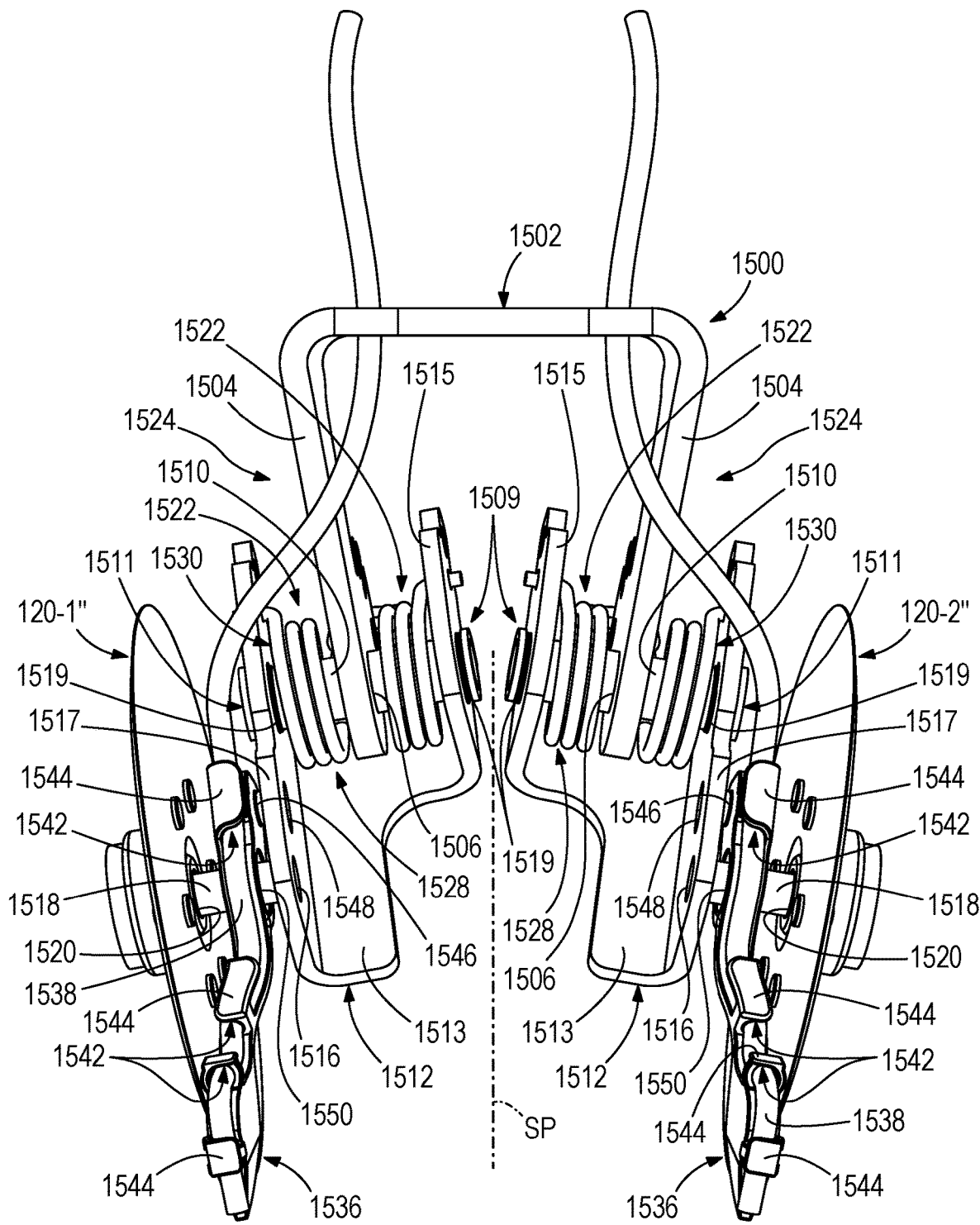
FIG. 29 is a rear elevation view of a portion of the planter row unit of FIG. 26
Figure 30:
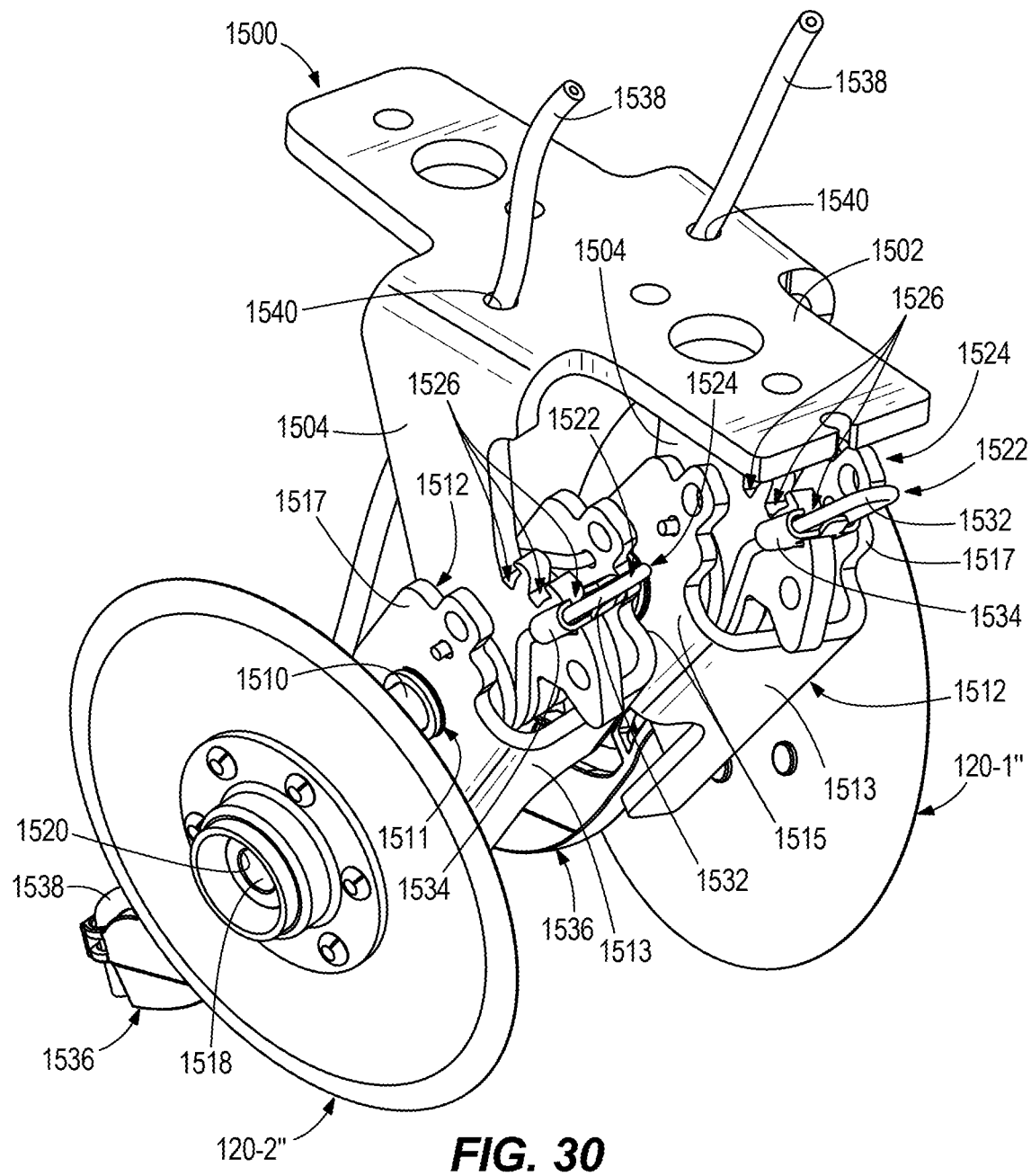
FIG. 30 is a top perspective view of a portion of the planter row unit of FIG. 26 showing one example of an adjustment mechanism associated with one example of an opener disc, the adjustment mechanism showing one example of a biasing member in a first position.
Figure 31:
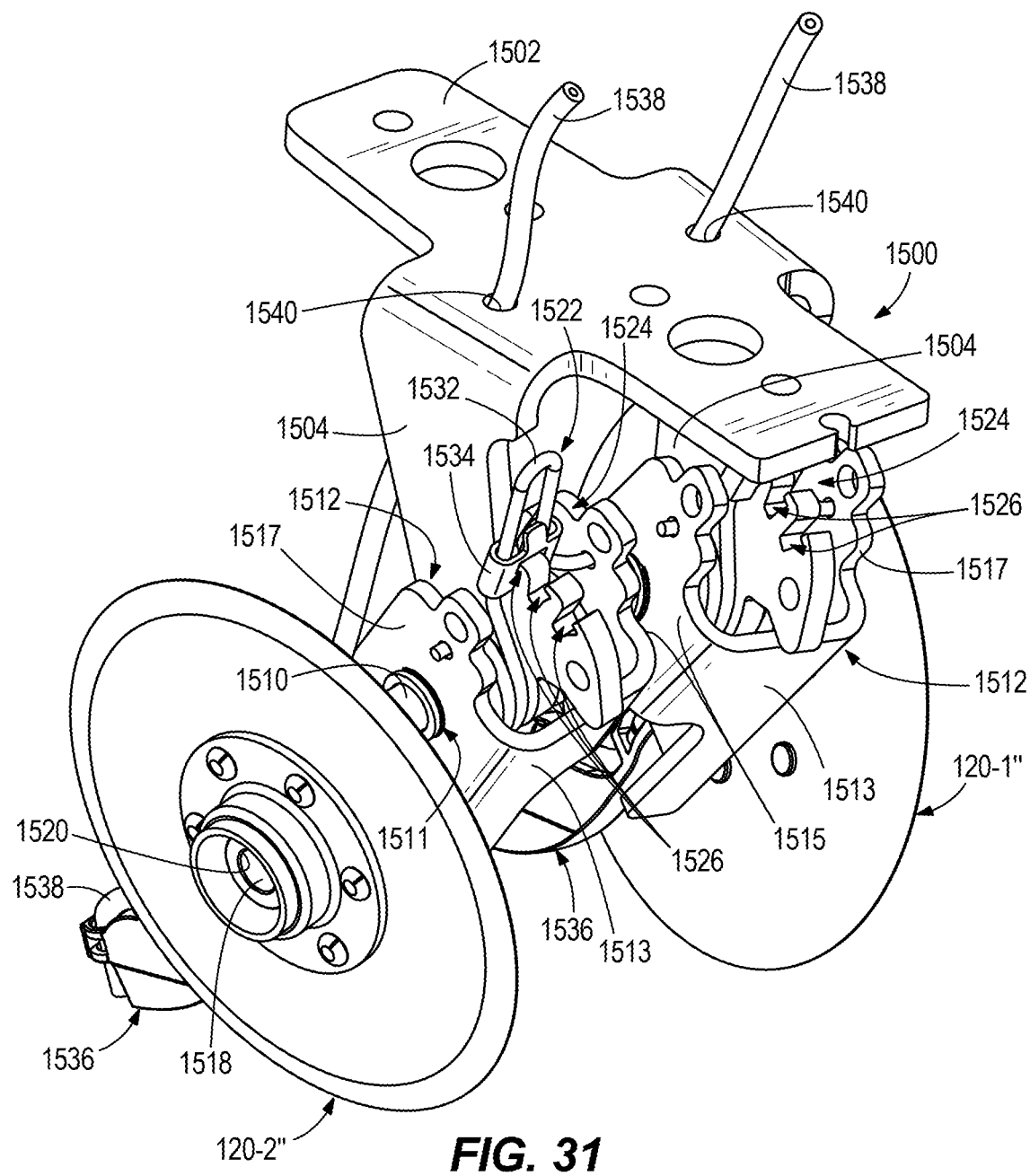
FIG. 31 is a top perspective view of the adjustment mechanism of FIG. 30 with the biasing member in a second position.
Figure 32:
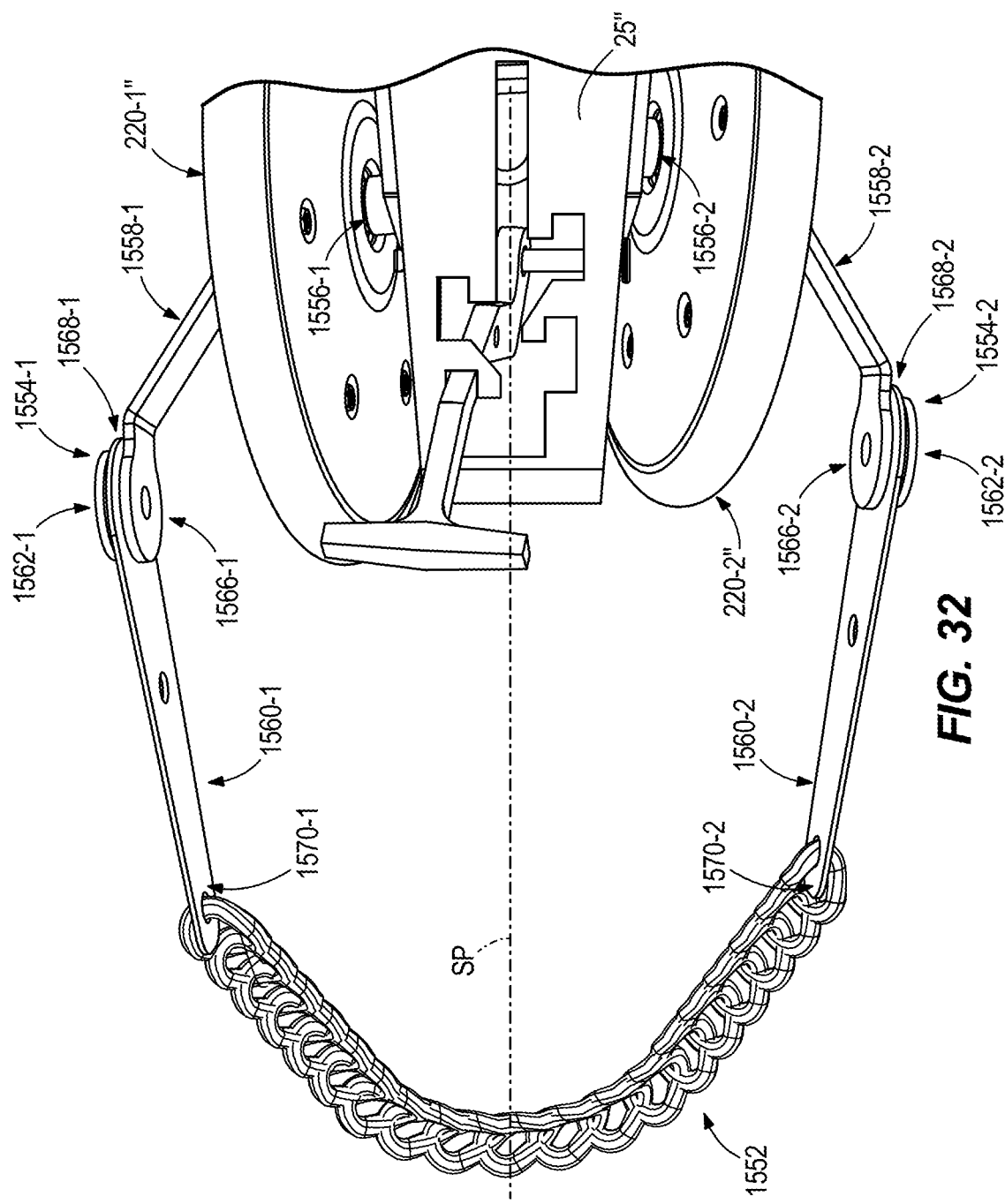
FIG. 32 is a top view of a portion of the planter row unit of FIG. 26.

With continued reference to FIGS. 26-32 and particular reference to FIGS. 29-31, the planter row unit 200" optionally includes adjustment mechanisms or assemblies 1524 for adjusting tension or stiffness of the biasing members 1522 associated with the vertically moveable openers 120". The adjustment assemblies 1524 optionally include a plurality of conditions or settings with each condition providing a different tension or stiffness to the biasing members 1522. In one example, each flange 1504 of the bracket 1500 optionally includes a plurality of recesses or detents 1526. In one example, the flanges 1504 each optionally include three recesses 1526 to provide three tension or stiffness conditions. However, in other examples, the flanges 1504 can optionally include any number of recesses to provide any number of different tension or stiffness conditions. Each of the biasing members 1522 optionally includes an interior portion 1528 optionally wrapped around an interior portion of the respective shaft 1510, an exterior portion 1530 optionally wrapped around an exterior portion of the respective shaft 1510, and a medial portion 1532 optionally coupled to and extending between the interior and exterior portions 1528, 1530. The medial portion 1532 of each biasing member 1522 optionally wraps around and extends above the portion of the flanges 1504 including the recesses 1526 therein. The medial portions 1532 are sized and shaped as to facilitate movement of the medial portions 1532 relative to the portion of the flanges 1504 including the recesses 1526, but not to interfere with the portion of the flanges 1504 including the recesses 1526 during movement. A locking member 1534 is optionally coupled to each of the medial portions 1532 of the biasing members 1522 and is optionally moveable along the respective medial portion 1532. The medial portions 1532 are moved into alignment with a desired one of the recesses 1526 and the locking member 1534 is moved downward into the associated recess 1526. With the locking member 1534 positioned in the associated recess 1526, the biasing member 1522 is locked or secured in the desired position to provide the desired tension or stiffness to the biasing member 1522. If it is desirable to change the tension or stiffness of the biasing members 1522, the locking members 1534 are moved upward out of the associated recesses 1526, each of the medial portions 1532 is moved into alignment with the desired recess 1526, and each locking member 1534 is moved downward into the associated recess 1526 to provide the new tension or stiffness to the biasing members 1522.

With further reference to FIGS. 26-32, an example of a pair of support members 1536 are illustrated for supporting crop input applicators 1538. In this example, each support member 1536 optionally supports one applicator 1538. The support members 1536 are disposed relative to the openers 120" to position the supported applicators 1538 relative to the trenches opened by the openers 120". The applicators 1538 are configured to dispense crop input into the associated trench. In the present example, the applicators are optionally tubes or conduits 1538 in fluid communication with a fluid source. In one example, the bracket 1500 optionally defines a pair of apertures 1540 therein through which the tubes or conduits 1538 may pass. Each support member 1536 optionally includes a plurality of apertures 1542 defined therein and projections 1544 extending therefrom in which the associated tube 1538 is positioned to provide support to the associated tube 1538. In this example, the support members 1536 are optionally made of a resilient material (e.g., plastic). The resiliency of the support members 1536 allows the support members 1536 to deflect or move when engaged with a rock, other debris, or the ground without permanently deforming or breaking the support members 1536. If the support members were made of a rigid material, such engagement with a rock, debris, or the ground may permanently deform or break the support members. In the present example, the support members 1536 are optionally coupled to respective coupling members 1512. Each of the support members 1536 optionally includes a projection 1546 extending into an aperture 1548 defined in the exterior flanges 1517 of the coupling members 1512. Each support member 1536 also optionally defines a shaft aperture 1550 therein for optionally receiving the associated opener shaft 1518. With this configuration, the support members 1536, the openers 120", and the applicators 1538 can move vertically relative to the bracket 1500 and the frame 25".

With continued reference to FIGS. 26-32, one example of a finishing device 1552 is coupled to the planter row unit 200". The finishing device 1552 is downstream of and trails all the other components of the planter row unit 200" so as to be the last device of the planter row unit 200" to engage the ground. In one example, the finishing device is optionally a chain 1552. The finishing device 1552 is optionally coupled to the planter row unit 200" with a pair of support arms 1554. One of the support arms 1554-1 is optionally coupled to a pivot 1556-1 of one closing wheel 220-1" and the other support arm 1554-2 is optionally coupled to a pivot 1556-2 of the other closing wheel 220-2". In this example, the support arms 1554 are spaced-apart from each other. In one example, each of the support arms 1554 optionally includes a first portion 1558 and a second portion 1560 optionally rotatably coupled to each other at an arm pivot 1562. The first portion 1558 of each support arm 1554 optionally has a first end 1564 coupled to the pivot 1556 of the closing wheel 220" and a second end 1566 coupled to a first end 1568 of the second portion 1560 of the support arm 1554 at the arm pivot 1562. A second end 1570 of each second portion 1560 of the support arm 1554 is optionally coupled to the finishing device 1552. As a point of reference, the seed trench defines a vertical seed trench plane SP extending vertically from a center of the seed trench. In one example, with respect to both support arms 1554, the first end 1564 of the first portion 1558 is optionally disposed closer to the seed trench plane SP than the second end 1566 of the first portion 1558, the first end 1568 of the second portion 1560 is optionally disposed further from the seed trench plane SP than the second end 1570 of the second portion 1560, and the arm pivot 1562 is optionally disposed further from the seed trench plane SP than the first end 1564 of the first portion 1558 and the second end 1570 of the second portion 1560. In one example, the second portions 1560 of the support arms 1554 are optionally pivotal relative to the respective first portions 1558 of the support arms 1554 at the arm pivots 1562. During operation, the finishing device 1552 may occasionally engage debris or a change in ground elevation that will want to flip up the finishing device 1552 from the ground. The configuration of the support arms 1554 inhibits the finishing device 1552 from significantly flipping up to the extent where the finishing device 1552 would snag or engage a portion of the subframe 25" proximate the closing wheels 220". Pivoting the second portions 1560 of the support arms 1554 relative to the first portions 1558 of the support arms 1554 moves the second ends 1570 of the second portions 1560 away from each other, thereby pulling the finishing device 1552 more taut. The increased tautness of the finishing device 1552 inhibits the finishing device 1552 from moving further upward, thereby causing the finishing device 1552 to fall back to the ground.

Although various examples and embodiments have been described above, the details and features of the disclosed examples and embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents. For example, any feature described for one example or embodiment may be used in any other example or embodiment to any extent and in any combination.

The invention claimed is:

1. A planter row unit comprising:
   a frame;
   a first opener disc rotatably coupled to the frame and configured to open a seed trench;
   a closing wheel rotatably coupled to the frame and configured to close the seed trench;
   a second opener disc coupled to the frame and configured to open a second trench different than the seed trench, wherein the second opener disc is rotatable relative to the frame and is vertically moveable relative to the frame;
   an adjustment assembly; and
   a biasing member biasing the second opener disc downward without biasing the closing wheel, the biasing member connected to the adjustment assembly, the adjustment assembly comprising a plurality of settings with each setting providing a different tension or stiffness to the biasing member which in turn provides a different biasing on the vertically moveable second opener disc.

2. The planter row unit of claim 1, further comprising a coupling member coupled to and between the second opener disc and the frame, wherein the coupling member and the second opener disc are rotatable relative to the frame.

3. The planter row unit of claim 2, further comprising a first shaft coupled to the coupling member and the frame and a second shaft coupled to the second opener disc and the coupling member, wherein the second opener disc rotates about the second shaft relative to the coupling member and the frame, and wherein the second opener disc and the coupling member rotate relative to the frame via the first shaft.

4. The planter row unit of claim 3, wherein the biasing member is directly attached to the coupling member.

5. The planter row unit of claim 4, wherein the biasing member is at least partially wrapped around the first shaft.

6. The planter row unit of claim 1, further comprising an applicator support member and an applicator, wherein the applicator support member is coupled to the frame and at least partially alignable with the second trench, the applicator support member is made of a resilient material to allow movement of the applicator support member and inhibit damage of the applicator support member, and the applicator is supported by the applicator support member and configured to dispense crop input into the second trench.

7. The planter row unit of claim 6, wherein the applicator support member is made of plastic material.

8. The planter row unit of claim 6, wherein the applicator support, and the applicator are vertically moveable relative to the frame.

9. The planter row unit of claim 6, wherein the applicator support, and the applicator are rotatable relative to the frame.

10. The planter row unit of claim 6, wherein the applicator is a tube.

11. An opener assembly for a planter row unit, the opener assembly comprising:
    a bracket configured to couple to the planter row unit, the bracket comprising an adjustment assembly;
    an opener disc coupled to the bracket, wherein the opener disc is rotatable relative to the bracket to open a seed trench and is vertically moveable relative to the bracket;

a closing wheel configured to close the seed trench; and
a biasing member coupled to and between the adjustment assembly and the opener disc, wherein the biasing member biases the opener disc vertically downward without biasing the closing wheel, the adjustment assembly comprising a plurality of settings with each setting providing a different tension or stiffness to the biasing member which in turn provides a different biasing on the vertically moveable opener disc.

12. The opener assembly of claim 11, further comprising a coupling member coupled to and between the opener disc and the bracket, wherein the coupling member and the opener disc are rotatable relative to the bracket.

13. The opener assembly of claim 12, further comprising a first shaft coupled to the coupling member and the bracket and a second shaft coupled to the opener disc and the coupling member, wherein the opener disc rotates about the second shaft relative to the coupling member and the bracket, and wherein the opener disc and the coupling member rotate relative to the bracket via the first shaft.

14. The opener assembly of claim 13, wherein the biasing member is at least partially wrapped around the first shaft.

15. The opener assembly of claim 13, wherein the biasing member is directly attached to the coupling member.

16. The opener assembly of claim 11, wherein the adjustment assembly of the bracket includes a first recess and a second recess, wherein the biasing member is selectively moveable between a first position, in which a portion of the biasing member engages the first recess to provide a first stiffness to the biasing member, and a second position, in which the portion of the biasing member engages the second recess to provide a second stiffness to the biasing member different than the first stiffness.

17. The opener assembly of claim 16, wherein the adjustment assembly further comprises a locking member configured to lock the portion of the biasing member in the first recess in the first position and in the second recess in the second position.

* * * * *